US012566406B2

(12) United States Patent
Pandey et al.

(10) Patent No.: US 12,566,406 B2
(45) Date of Patent: Mar. 3, 2026

(54) DARK FIELD DIGITAL HOLOGRAPHIC MICROSCOPE AND ASSOCIATED METROLOGY METHOD

(71) Applicant: ASML NETHERLANDS B.V., Veldhoven (NL)

(72) Inventors: Nitesh Pandey, San Jose, CA (US); Arie Jeffrey Den Boef, Waalre (NL); Hugo Augustinus Joseph Cramer, Eindhoven (NL); Vasco Tomas Tenner, Eindhoven (NL)

(73) Assignee: ASML NETHERLANDS B.V., Veldhoven (NL)

( * ) Notice: Subject to any disclaimer, the term of this patent is extended or adjusted under 35 U.S.C. 154(b) by 56 days.

(21) Appl. No.: 18/034,356

(22) PCT Filed: Oct. 7, 2021

(86) PCT No.: PCT/EP2021/077753
§ 371 (c)(1),
(2) Date: Apr. 27, 2023

(87) PCT Pub. No.: WO2022/100939
PCT Pub. Date: May 19, 2022

(65) Prior Publication Data
US 2023/0341813 A1      Oct. 26, 2023

(51) Int. Cl.
*G03H 1/04*        (2006.01)
*G03H 1/00*        (2006.01)
*G03H 1/26*        (2006.01)

(52) U.S. Cl.
CPC ........... *G03H 1/0443* (2013.01); *G03H 1/265* (2013.01); *G03H 2001/0033* (2013.01);
(Continued)

(58) Field of Classification Search
CPC ................. G03H 1/0443; G03H 1/265; G03H 2001/0033; G03H 2001/005; G03H 2001/0473; G03H 2223/23
See application file for complete search history.

(56) References Cited

U.S. PATENT DOCUMENTS 6,548,796 B1 * 4/2003 Silvermintz ....... G02B 21/0024
                                                             250/201.3
8,681,312 B2   3/2014 Straaijer
                 (Continued)

FOREIGN PATENT DOCUMENTS

EP        1628164       2/2006
JP      2011507264      3/2011
           (Continued)

OTHER PUBLICATIONS

International Search Report and Written Opinion issued in corresponding International Application No. PCT/EP2021/077753, dated Jan. 12, 2022.
(Continued)

*Primary Examiner* — Michelle M Iacoletti
*Assistant Examiner* — Jarreas C Underwood
(74) *Attorney, Agent, or Firm* — Pillsbury Winthrop Shaw Pittman, LLP

(57)            ABSTRACT

A dark field digital holographic microscope and associated metrology method is disclosed which is configured to determine a characteristic of interest of a structure. The dark field digital holographic microscope includes an illumination branch for providing illumination radiation to illuminate the structure; a detection arrangement for capturing object radiation resulting from diffraction of the illumination radiation by the structure; and a reference branch for providing reference radiation for interfering with the object radiation to obtain an image of an interference pattern formed by the illumination radiation and reference radiation. The reference
(Continued)

branch has an optical element operable to vary a characteristic of the reference radiation so as to reduce and/or minimize variation in a contrast metric of the image within a field of view of the dark field digital holographic microscope at a detector plane.

20 Claims, 8 Drawing Sheets

(52) U.S. Cl.
CPC ................. *G03H 2001/005* (2013.01); *G03H 2001/0473* (2013.01); *G03H 2223/23* (2013.01)

(56) References Cited

U.S. PATENT DOCUMENTS

| | | | |
|---|---|---|---|
| 8,692,994 | B2 | 4/2014 | Straaijer |
| 8,792,096 | B2 | 7/2014 | Straaijer |
| 8,797,554 | B2 | 8/2014 | Straaijer |
| 8,823,922 | B2 | 9/2014 | Den Boef |
| 10,568,503 | B2* | 2/2020 | Bublitz .............. G01B 9/02043 |
| 10,799,111 | B2* | 10/2020 | Schmoll .............. A61B 3/1025 |
| 11,520,239 | B2 | 12/2022 | Tel et al. |
| 2006/0033921 | A1 | 2/2006 | Den Boef et al. |
| 2006/0066855 | A1 | 3/2006 | Boef et al. |
| 2007/0296960 | A1 | 12/2007 | Den Boef et al. |
| 2008/0198380 | A1 | 8/2008 | Straaijer et al. |
| 2009/0168062 | A1 | 7/2009 | Straaijer et al. |
| 2010/0201963 | A1 | 8/2010 | Cramer et al. |
| 2010/0328655 | A1 | 12/2010 | Den Boef |
| 2011/0026032 | A1 | 2/2011 | Den Boef et al. |
| 2011/0027704 | A1 | 2/2011 | Cramer et al. |
| 2011/0043791 | A1 | 2/2011 | Smilde et al. |
| 2011/0102753 | A1 | 5/2011 | Van De Kerkhof et al. |
| 2011/0141273 | A1* | 6/2011 | Dubois ................ G03H 1/0866 356/458 |
| 2011/0249244 | A1 | 10/2011 | Leewis et al. |
| 2011/0292363 | A1* | 12/2011 | Ivey ................... G03F 7/70158 355/55 |
| 2012/0044470 | A1 | 2/2012 | Smilde et al. |
| 2012/0123581 | A1 | 5/2012 | Smilde et al. |
| 2013/0162996 | A1 | 6/2013 | Straaijer |
| 2013/0258310 | A1 | 10/2013 | Smilde et al. |
| 2013/0271740 | A1 | 10/2013 | Quintanilha |
| 2016/0161863 | A1 | 6/2016 | Den Boef et al. |
| 2016/0231241 | A1 | 8/2016 | Pandey |
| 2016/0370717 | A1 | 12/2016 | Den Boef et al. |
| 2017/0224208 | A1* | 8/2017 | Bublitz .............. G01B 9/02032 |
| 2019/0265028 | A1* | 8/2019 | Tinnemans ........... G03F 7/7065 |
| 2020/0285157 | A1 | 9/2020 | Tarabrin |
| 2022/0035255 | A1 | 2/2022 | Van Der Schaar et al. |
| 2023/0010572 | A1* | 1/2023 | Ideguchi ............ G01N 21/4788 |

FOREIGN PATENT DOCUMENTS

| | | |
|---|---|---|
| TW | I629574 | 7/2018 |
| TW | 202028884 | 8/2020 |
| TW | I709828 | 11/2020 |
| WO | 2009/078708 | 6/2009 |
| WO | 2009/106279 | 9/2009 |
| WO | 2013/178422 | 12/2013 |
| WO | 2016030205 | 3/2016 |
| WO | 2019/197117 | 10/2019 |

OTHER PUBLICATIONS

European Search Report issued in corresponding European Patent Application No. 20207848, dated Apr. 30, 2021.

Anonymous, "Illumination arrangement and associated dark field digital holographic microscope", Research Disclosure, vol. 678, No. 35, pp. 1-40, Oct. 1, 2020.

C. Messinis et al. "Impact of coherence length on the field of view in dark-field holographic microscopy for semiconductor metrology: theoretical and experimental comparisons." Applied Optics, vol. 59, No. 11, pp. 3498-3507 (Apr. 10, 2020).

Y. Liu et al., "Computational optical coherence tomography [Invited]", Biomedical Optics Express, vol. 8, No. 3, pp. 1549-1574 (2017).

E. Auksorius et al., "Dark-Field Full-Field Optical Coherence Tomography." Optics Letters, vol. 40, No. 14, pp. 1-4 (2015).

P. Kolman et al., "Coherence-controlled holographic microscope," Optics Express, vol. 18, No. 21, pp. 21990-22003 (2010).

Presentation Ronian Siew , Envision 2020, ZeMax (online) Conference (Oct. 6-8, 2020).

S. Berg-Johansen et al., "Classically entangled optical beams for high-speed kinematic sensing", Optica, vol. 2, No. 10, pp. 864-868 (2015).

T. Slabý et al., "Off-axis setup taking full advantage of incoherent illumination in coherence-controlled holographic microscope", Optics Express, vol. 21, No. 12, pp. 14747-14762 (2013).

A. S. Shcherbakov et al., "Optical Spectrometer with Acousto-Optical Dynamic Grating for Guillermo Haro Astrophysical Observatory", International Journal of Astronomy and Astrophysics, vol. 3, pp. 376-384 (2013).

Z. Monemhaghdoust et al., "Dual wavelength full field imaging in low coherence digital holographic microscopy", Optics Express, vol. 19, No. 24, pp. 24005-24022 (2011).

N. Kim et al., "How to design a Gaussian to Top Hat beam shaper", Zemax, pp. 1-10 (Mar. 31, 2021).

R. Siew, "Relative illumination and image distortion", Optical Engineering, vol. 56, No. 4, pp. 049701-049704 (2017).

R. Siew, "Corrigendum: Corrections to classical radiometry and the brightness of stars", European Journal of Physics, vol. 37, pp. 1105-1114 (2016).

R. Siew, "Distinction between image magnification and irradiance magnification: a commentary", Optical Engineering, vol. 56(2), pp. 029701-1-029701-3 (2017).

D. L. Shealy et al., "Laser beam shaping profiles and propagation", Applied Optics, vol. 45, No. 21, pp. 5118-5131 (2006).

J. Sasian, "Formulae for the geometrical propagation of a beam of light", Applied Optics, vol. 59, No. 22, pp. G24-G32 (Aug. 2020).

Office Action issued in corresponding Japanese Patent Application No. 2023-526485, dated Oct. 24, 2025.

* cited by examiner

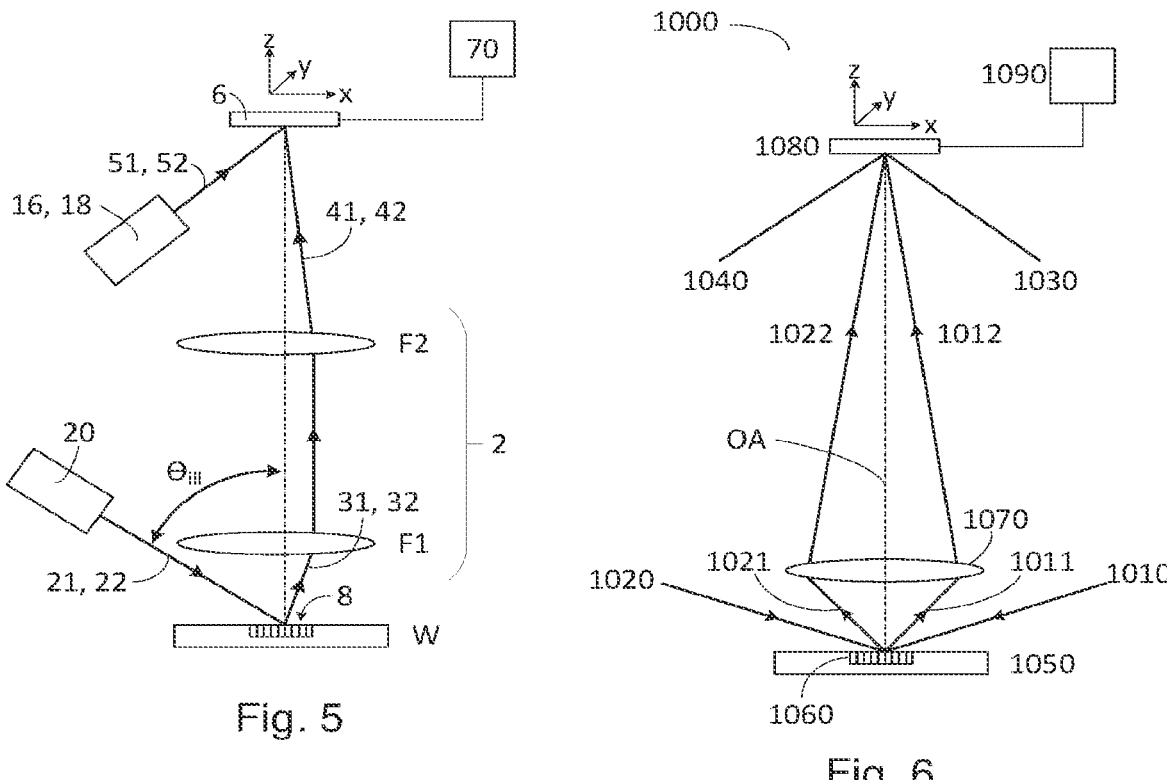
Fig. 5
Fig. 6
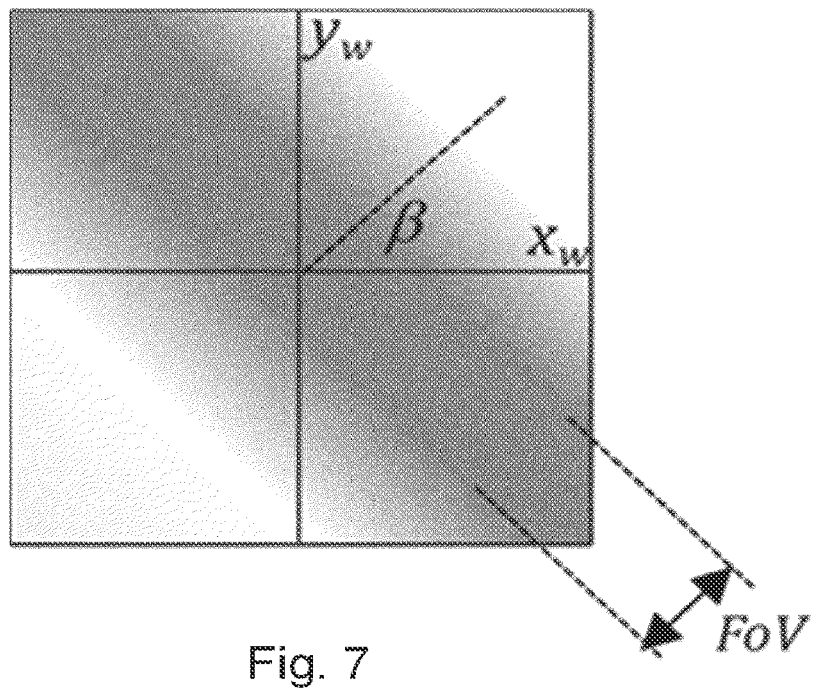
Fig. 7

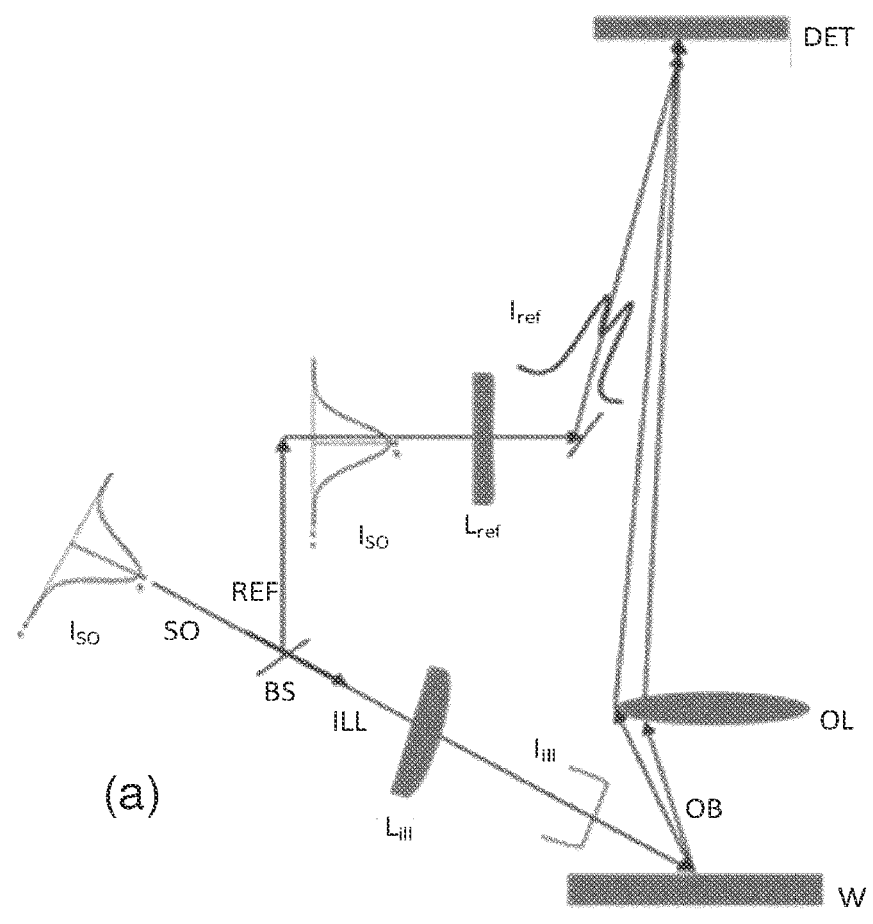
(a)
Fig. 8
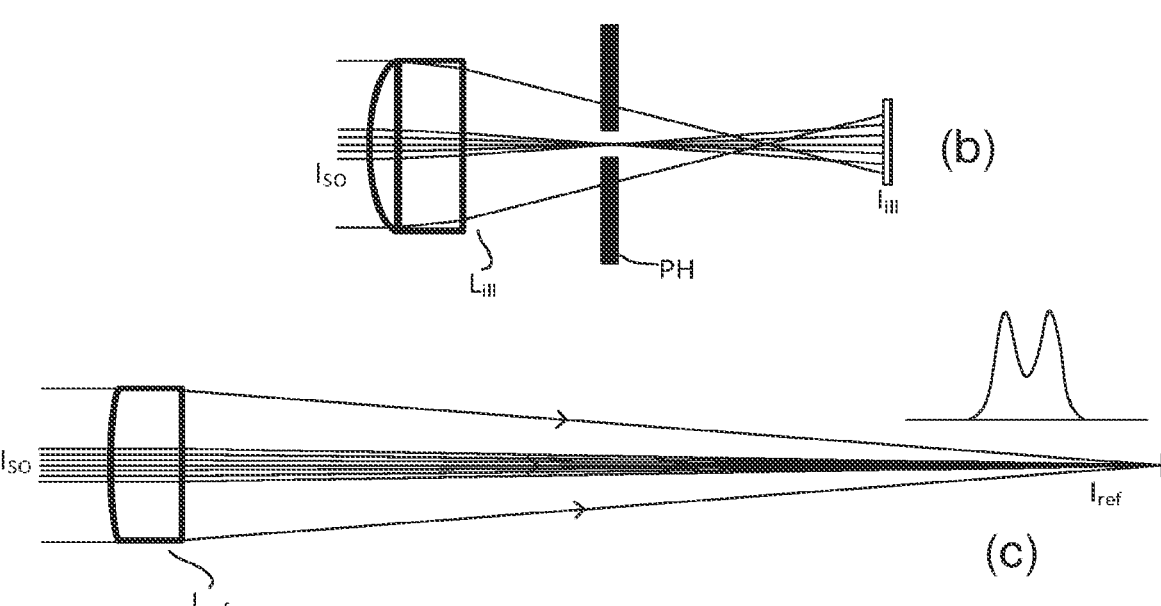
(b)
(c)

(a)

(b)

(c)

DARK FIELD DIGITAL HOLOGRAPHIC MICROSCOPE AND ASSOCIATED METROLOGY METHOD

CROSS-REFERENCE TO RELATED APPLICATIONS

This application is the U.S. national phase entry of PCT Patent Application No. PCT/EP2021/077753 which was filed on Oct. 7, 2021, which claims priority of European Patent Application No. 20207848.1 which was filed on Nov. 16, 2020 and which is incorporated herein in its entirety by reference.

FIELD

The present invention relates to dark field digital holographic microscopy and in particular high speed dark field digital holographic microscopy and in relation to metrology applications in the manufacture of integrated circuits.

BACKGROUND

A lithographic apparatus is a machine constructed to apply a desired pattern onto a substrate. A lithographic apparatus can be used, for example, in the manufacture of integrated circuits (ICs). A lithographic apparatus may, for example, project a pattern (also often referred to as "design layout" or "design") at a patterning device (e.g., a mask) onto a layer of radiation-sensitive material (resist) provided on a substrate (e.g., a wafer).

To project a pattern on a substrate a lithographic apparatus may use electromagnetic radiation. The wavelength of this radiation determines the minimum size of features which can be formed on the substrate. Typical wavelengths currently in use are 365 nm (i-line), 248 nm, 193 nm and 13.5 nm. A lithographic apparatus, which uses extreme ultraviolet (EUV) radiation, having a wavelength within the range 4-20 nm, for example 6.7 nm or 13.5 nm, may be used to form smaller features on a substrate than a lithographic apparatus which uses, for example, radiation with a wavelength of 193 nm.

Low-$k_1$ lithography may be used to process features with dimensions smaller than the classical resolution limit of a lithographic apparatus. In such process, the resolution formula may be expressed as $CD=k_1 \times \lambda/NA$, where $\lambda$ is the wavelength of radiation employed, NA is the numerical aperture of the projection optics in the lithographic apparatus, CD is the "critical dimension" (generally the smallest feature size printed, but in this case half-pitch) and $k_1$ is an empirical resolution factor. In general, the smaller $k_1$ the more difficult it becomes to reproduce the pattern on the substrate that resembles the shape and dimensions planned by a circuit designer in order to achieve particular electrical functionality and performance. To overcome these difficulties, sophisticated fine-tuning steps may be applied to the lithographic projection apparatus and/or design layout. These include, for example, but not limited to, optimization of NA, customized illumination schemes, use of phase shifting patterning devices, various optimization of the design layout such as optical proximity correction (OPC, sometimes also referred to as "optical and process correction") in the design layout, or other methods generally defined as "resolution enhancement techniques" (RET). Alternatively, tight control loops for controlling a stability of the lithographic apparatus may be used to improve reproduction of the pattern at low k1.

During the manufacturing process there is a need to inspect the manufactured structures and/or to measure characteristics of the manufactured structures. Suitable inspection and metrology apparatuses are known in the art. One of the known metrology apparatuses is a dark field holographic microscope.

Dark field holographic microscope have the problem of contrast variation of captured interference fringes at the camera as a function of position with respect to the center of the field of view.

It is desirable to provide a dark field holographic microscope with improved contrast response within the Field of View.

SUMMARY

In a first aspect of the invention, there is provided a dark field digital holographic microscope configured to determine a characteristic of interest of a structure, comprising: an illumination branch for providing illumination radiation to illuminate said structure; a detection arrangement for capturing object radiation resulting from diffraction of the illumination radiation by said structure; a reference branch for providing reference radiation for interfering with the object beam to obtain an image of an interference pattern formed by the illumination radiation and reference radiation; and at least one reference branch optical element operable to modulate the reference radiation to impose an optimized reference illumination profile which, when multiplied by a coherence contribution function of an intensity distribution of the interference pattern, results in an effective reference illumination profile with a substantially flat top so as to reduce and/or minimize variation in a contrast metric of the image within a field of view of the dark field digital holographic microscope at a detector plane.

In a second aspect of the invention, there is provided a method of determining a characteristic of interest of a structure, comprising: providing illumination radiation to illuminate said structure; capturing object radiation resulting from diffraction of the illumination radiation by said structure; providing reference radiation for interfering with the object beam to obtain an image of an interference pattern formed by the illumination radiation and reference radiation; and modulating the reference radiation to impose an optimized reference illumination profile which, when multiplied by a coherence contribution function of an intensity distribution of the interference pattern, results in an effective reference illumination profile with a substantially flat top so as to reduce and/or minimize variation in a contrast metric of the image within a field of view at a detector plane.

BRIEF DESCRIPTION OF THE DRAWINGS

Embodiments of the invention will now be described, by way of example only, with reference to the accompanying schematic drawings, in which:

FIG. 5 depicts schematically an example of a dark field digital holographic microscope operated in a sequential acquisition scheme adaptable using the concepts disclosed herein;

FIG. 6 depicts schematically a dark field digital holographic microscope (df-DHM) operable in a parallel acquisition scheme, and adaptable using the concepts disclosed herein;

FIG. 7 depicts a diffraction fringe within a field of view of a detector, illustrating the effect of contrast variation;

FIG. 8 depicts schematically (a) a first dark field digital holographic microscope, in accordance with an embodiment; (b) a detail of an illumination path lens element of the dark field digital holographic microscope of FIG. 8(*a*); and (c) a detail of a reference path lens element of the dark field digital holographic microscope of FIG. 8(*a*);

DETAILED DESCRIPTION

In the present document, the terms "radiation" and "beam" are used to encompass all types of electromagnetic radiation, including ultraviolet radiation (e.g. with a wavelength of 365, 248, 193, 157 or 126 nm) and EUV (extreme ultra-violet radiation, e.g. having a wavelength in the range of about 5-100 nm).

The term "reticle", "mask" or "patterning device" as employed in this text may be broadly interpreted as referring to a generic patterning device that can be used to endow an incoming radiation beam with a patterned cross-section, corresponding to a pattern that is to be created in a target portion of the substrate. The term "light valve" can also be used in this context. Besides the classic mask (transmissive or reflective, binary, phase-shifting, hybrid, etc.), examples of other such patterning devices include a programmable mirror array and a programmable LCD array.

Figures 1, 2:
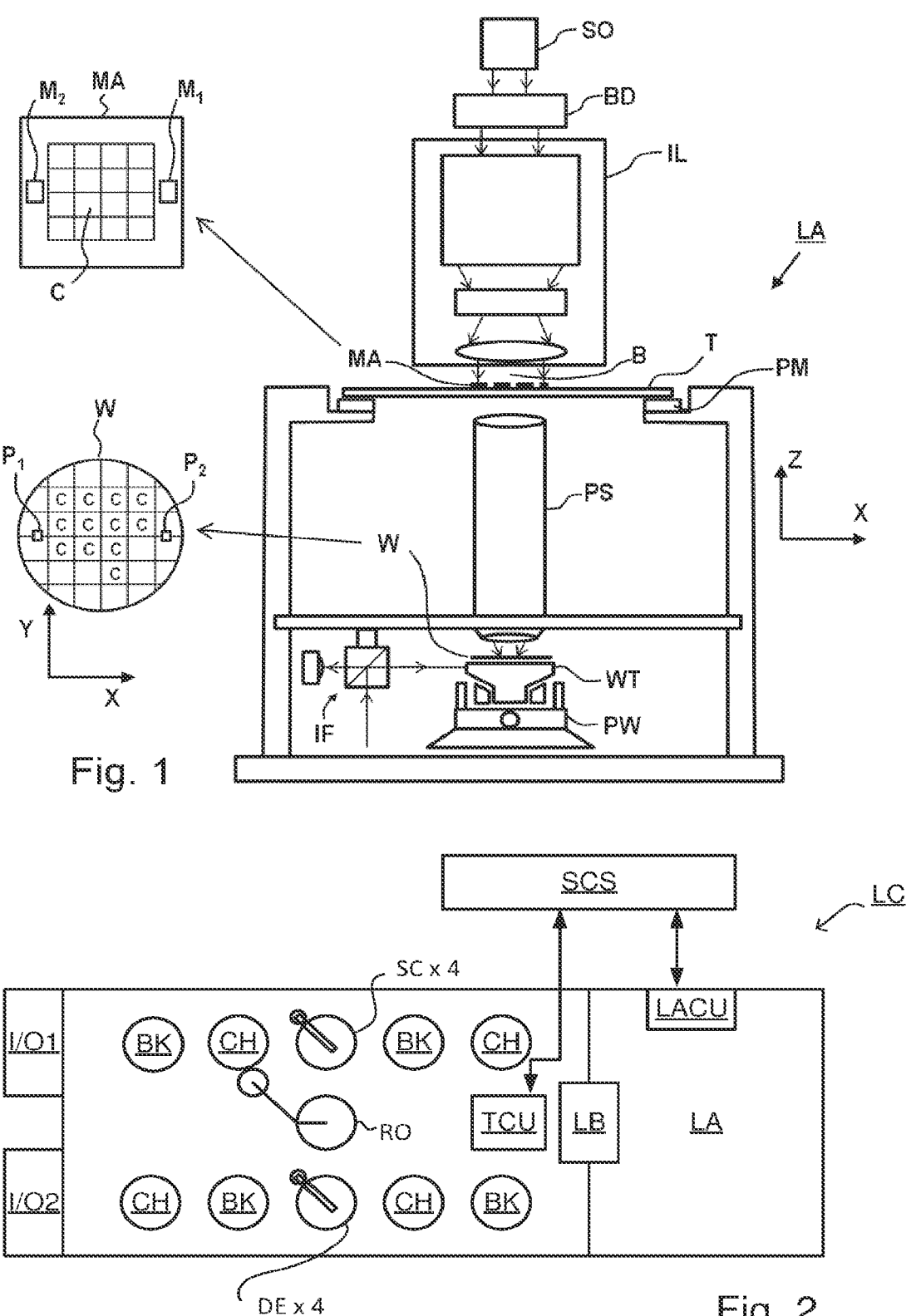
FIG. 1 depicts a schematic overview of a lithographic apparatus.
FIG. 2 depicts a schematic overview of a lithographic cell.

FIG. 1 schematically depicts a lithographic apparatus LA. The lithographic apparatus LA includes an illumination system (also referred to as illuminator) ILL configured to condition a radiation beam B (e.g., UV radiation, DUV radiation or EUV radiation), a mask support (e.g., a mask table) T constructed to support a patterning device (e.g., a mask) MA and connected to a first positioner PM configured to accurately position the patterning device MA in accordance with certain parameters, a substrate support (e.g., a wafer table) WT constructed to hold a substrate (e.g., a resist coated wafer) W and connected to a second positioner PW configured to accurately position the substrate support in accordance with certain parameters, and a projection system (e.g., a refractive projection lens system) PS configured to project a pattern imparted to the radiation beam B by patterning device MA onto a target portion C (e.g., comprising one or more dies) of the substrate W.

In operation, the illumination system ILL receives a radiation beam from a radiation source SO, e.g. via a beam delivery system BD. The illumination system ILL may include various types of optical components, such as refractive, reflective, magnetic, electromagnetic, electrostatic, and/or other types of optical components, or any combination thereof, for directing, shaping, and/or controlling radiation. The illuminator ILL may be used to condition the radiation beam B to have a desired spatial and angular intensity distribution in its cross section at a plane of the patterning device MA.

The term "projection system" PS used herein should be broadly interpreted as encompassing various types of projection system, including refractive, reflective, catadioptric, anamorphic, magnetic, electromagnetic and/or electrostatic optical systems, or any combination thereof, as appropriate for the exposure radiation being used, and/or for other factors such as the use of an immersion liquid or the use of a vacuum. Any use of the term "projection lens" herein may be considered as synonymous with the more general term "projection system" PS.

The lithographic apparatus LA may be of a type wherein at least a portion of the substrate may be covered by a liquid having a relatively high refractive index, e.g., water, so as to fill a space between the projection system PS and the substrate W-which is also referred to as immersion lithography. More information on immersion techniques is given in U.S. Pat. No. 6,952,253, which is incorporated herein by reference.

The lithographic apparatus LA may also be of a type having two or more substrate supports WT (also named "dual stage"). In such "multiple stage" machine, the substrate supports WT may be used in parallel, and/or steps in preparation of a subsequent exposure of the substrate W may be carried out on the substrate W located on one of the substrate support WT while another substrate W on the other substrate support WT is being used for exposing a pattern on the other substrate W.

In addition to the substrate support WT, the lithographic apparatus LA may comprise a measurement stage. The measurement stage is arranged to hold a sensor and/or a cleaning device. The sensor may be arranged to measure a property of the projection system PS or a property of the radiation beam B. The measurement stage may hold multiple sensors. The cleaning device may be arranged to clean part of the lithographic apparatus, for example a part of the projection system PS or a part of a system that provides the immersion liquid. The measurement stage may move beneath the projection system PS when the substrate support WT is away from the projection system PS.

In operation, the radiation beam B is incident on the patterning device, e.g. mask, MA which is held on the mask support T, and is patterned by the pattern (design layout)

present on patterning device MA. Having traversed the mask MA, the radiation beam B passes through the projection system PS, which focuses the beam onto a target portion C of the substrate W. With the aid of the second positioner PW and a position measurement system IF, the substrate support WT can be moved accurately, e.g., so as to position different target portions C in the path of the radiation beam B at a focused and aligned position. Similarly, the first positioner PM and possibly another position sensor (which is not explicitly depicted in FIG. 1) may be used to accurately position the patterning device MA with respect to the path of the radiation beam B. Patterning device MA and substrate W may be aligned using mask alignment marks M1, M2 and substrate alignment marks P1, P2. Although the substrate alignment marks P1, P2 as illustrated occupy dedicated target portions, they may be located in spaces between target portions. Substrate alignment marks P1, P2 are known as scribe-lane alignment marks when these are located between the target portions C.

As shown in FIG. 2 the lithographic apparatus LA may form part of a lithographic cell LC, also sometimes referred to as a lithocell or (litho)cluster, which often also includes apparatus to perform pre- and post-exposure processes on a substrate W. Conventionally these include spin coaters SC to deposit resist layers, developers DE to develop exposed resist, chill plates CH and bake plates BK, e.g. for conditioning the temperature of substrates W e.g. for conditioning solvents in the resist layers. A substrate handler, or robot, RO picks up substrates W from input/output ports I/O1, I/O2, moves them between the different process apparatus and delivers the substrates W to the loading bay LB of the lithographic apparatus LA. The devices in the lithocell, which are often also collectively referred to as the track, are typically under the control of a track control unit TCU that in itself may be controlled by a supervisory control system SCS, which may also control the lithographic apparatus LA, e.g. via lithography control unit LACU.

In order for the substrates W exposed by the lithographic apparatus LA to be exposed correctly and consistently, it is desirable to inspect substrates to measure properties of patterned structures, such as overlay errors between subsequent layers, line thicknesses, critical dimensions (CD), etc. For this purpose, inspection tools (not shown) may be included in the lithocell LC. If errors are detected, adjustments, for example, may be made to exposures of subsequent substrates or to other processing steps that are to be performed on the substrates W, especially if the inspection is done before other substrates W of the same batch or lot are still to be exposed or processed.

An inspection apparatus, which may also be referred to as a metrology apparatus, is used to determine properties of the substrates W, and in particular, how properties of different substrates W vary or how properties associated with different layers of the same substrate W vary from layer to layer. The inspection apparatus may alternatively be constructed to identify defects on the substrate W and may, for example, be part of the lithocell LC, or may be integrated into the lithographic apparatus LA, or may even be a stand-alone device. The inspection apparatus may measure the properties on a latent image (image in a resist layer after the exposure), or on a semi-latent image (image in a resist layer after a post-exposure bake step PEB), or on a developed resist image (in which the exposed or unexposed parts of the resist have been removed), or even on an etched image (after a pattern transfer step such as etching).

Figure 3:
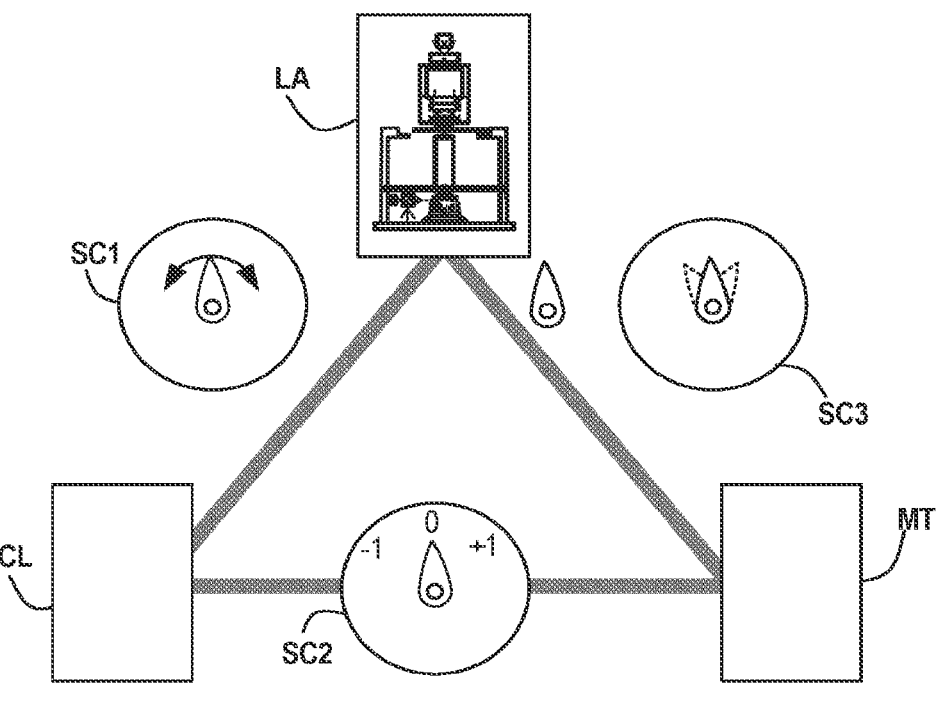
FIG. 3 depicts a schematic representation of holistic lithography, representing a cooperation between three key technologies to optimize semiconductor manufacturing.

Typically the patterning process in a lithographic apparatus LA is one of the most critical steps in the processing which requires high accuracy of dimensioning and placement of structures on the substrate W. To ensure this high accuracy, three systems may be combined in a so called "holistic" control environment as schematically depicted in FIG. 3. One of these systems is the lithographic apparatus LA which is (virtually) connected to a metrology tool MT (a second system) and to a computer system CL (a third system). The key of such "holistic" environment is to optimize the cooperation between these three systems to enhance the overall process window and provide tight control loops to ensure that the patterning performed by the lithographic apparatus LA stays within a process window. The process window defines a range of process parameters (e.g. dose, focus, overlay) within which a specific manufacturing process yields a defined result (e.g. a functional semiconductor device)-typically within which the process parameters in the lithographic process or patterning process are allowed to vary.

The computer system CL may use (part of) the design layout to be patterned to predict which resolution enhancement techniques to use and to perform computational lithography simulations and calculations to determine which mask layout and lithographic apparatus settings achieve the largest overall process window of the patterning process (depicted in FIG. 3 by the double arrow in the first scale SC1). Typically, the resolution enhancement techniques are arranged to match the patterning possibilities of the lithographic apparatus LA. The computer system CL may also be used to detect where within the process window the lithographic apparatus LA is currently operating (e.g. using input from the metrology tool MT) to predict whether defects may be present due to e.g. sub-optimal processing (depicted in FIG. 3 by the arrow pointing "0" in the second scale SC2).

The metrology tool MT may provide input to the computer system CL to enable accurate simulations and predictions, and may provide feedback to the lithographic apparatus LA to identify possible drifts, e.g. in a calibration status of the lithographic apparatus LA (depicted in FIG. 3 by the multiple arrows in the third scale SC3).

In lithographic processes, it is desirable to make frequently measurements of the structures created, e.g., for process control and verification. Tools to make such measurement are typically called metrology tools MT. Different types of metrology tools MT for making such measurements are known, including scanning electron microscopes or various forms of scatterometer metrology tools MT. Scatterometers are versatile instruments which allow measurements of the parameters of a lithographic process by having a sensor in the pupil or a conjugate plane with the pupil of the objective of the scatterometer, measurements usually referred as pupil based measurements, or by having the sensor in the image plane or a plane conjugate with the image plane, in which case the measurements are usually referred as image or field based measurements. Such scatterometers and the associated measurement techniques are further described in patent applications US20100328655, US2011102753A1, US20120044470A, US20110249244, US20110026032 or EP1,628,164A, incorporated herein by reference in their entirety. Aforementioned scatterometers may measure gratings using light from soft x-ray and visible to near-IR wavelength range.

In a first embodiment, the scatterometer MT is an angular resolved scatterometer. In such a scatterometer reconstruction methods may be applied to the measured signal to reconstruct or calculate properties of the grating. Such reconstruction may, for example, result from simulating interaction of scattered radiation with a mathematical model of the target structure and comparing the simulation results with those of a measurement. Parameters of the mathematical model are adjusted until the simulated interaction produces a diffraction pattern similar to that observed from the real target.

In a second embodiment, the scatterometer MT is a spectroscopic scatterometer MT. In such spectroscopic scatterometer MT, the radiation emitted by a radiation source is directed onto the target and the reflected or scattered radiation from the target is directed to a spectrometer detector, which measures a spectrum (i.e. a measurement of intensity as a function of wavelength) of the specular reflected radiation. From this data, the structure or profile of the target giving rise to the detected spectrum may be reconstructed, e.g. by Rigorous Coupled Wave Analysis and non-linear regression or by comparison with a library of simulated spectra.

In a third embodiment, the scatterometer MT is a ellipsometric scatterometer. The ellipsometric scatterometer allows for determining parameters of a lithographic process by measuring scattered radiation for each polarization states. Such metrology apparatus emits polarized light (such as linear, circular, or elliptic) by using, for example, appropriate polarization filters in the illumination section of the metrology apparatus. A source suitable for the metrology apparatus may provide polarized radiation as well. Various embodiments of existing ellipsometric scatterometers are described in U.S. patent application Ser. Nos. 11/451,599, 11/708,678, 12/256,780, 12/486,449, 12/920,968, 12/922, 587, 13/000,229, 13/033,135, 13/533,110 and 13/891,410 incorporated herein by reference in their entirety.

Figure 4:
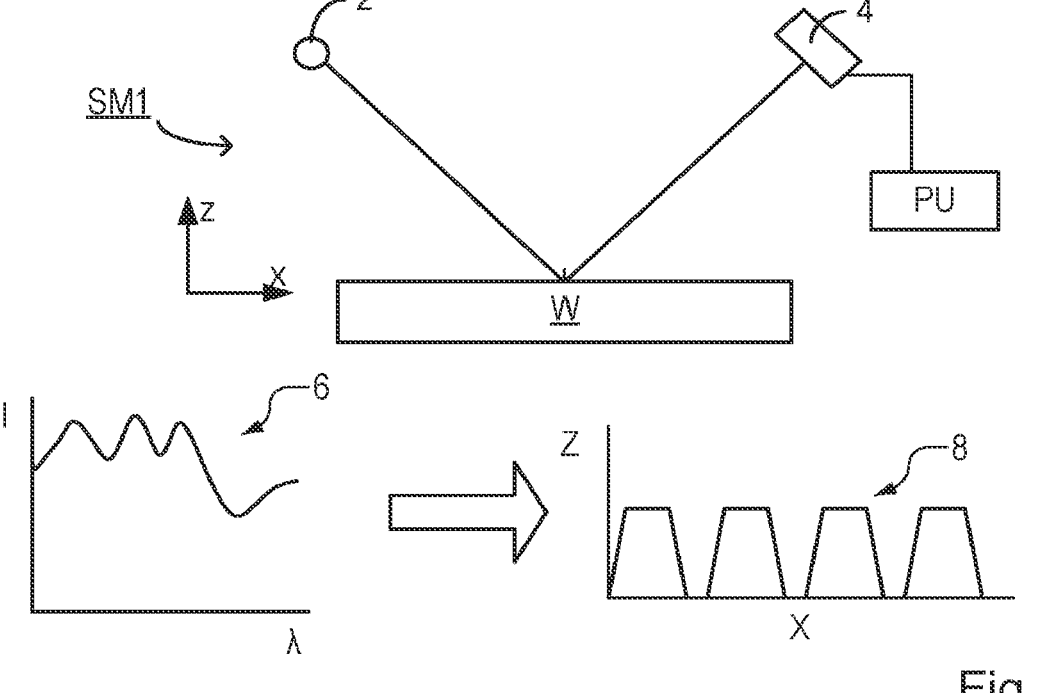
FIG. 4 depicts a schematic overview of a scatterometry apparatus used as a metrology device, which may comprise a dark field digital holographic microscope according to embodiments of the invention.

A metrology apparatus, such as a scatterometer, is depicted in FIG. 4. It comprises a broadband (white light) radiation projector 2 which projects radiation onto a substrate W. The reflected or scattered radiation is passed to a spectrometer detector 4, which measures a spectrum 6 (i.e. a measurement of intensity as a function of wavelength) of the specular reflected radiation. From this data, the structure or profile 8 giving rise to the detected spectrum may be reconstructed by processing unit PU, e.g. by Rigorous Coupled Wave Analysis and non-linear regression or by comparison with a library of simulated spectra as shown at the bottom of FIG. 3. In general, for the reconstruction, the general form of the structure is known and some parameters are assumed from knowledge of the process by which the structure was made, leaving only a few parameters of the structure to be determined from the scatterometry data. Such a scatterometer may be configured as a normal-incidence scatterometer or an oblique-incidence scatterometer.

Overall measurement quality of a lithographic parameter via measurement of a metrology target is at least partially determined by the measurement recipe used to measure this lithographic parameter. The term "substrate measurement recipe" may include one or more parameters of the measurement itself, one or more parameters of the one or more patterns measured, or both. For example, if the measurement used in a substrate measurement recipe is a diffraction-based optical measurement, one or more of the parameters of the measurement may include the wavelength of the radiation, the polarization of the radiation, the incident angle of radiation relative to the substrate, the orientation of radiation relative to a pattern on the substrate, etc. One of the criteria to select a measurement recipe may, for example, be a sensitivity of one of the measurement parameters to processing variations. More examples are described in US patent application US2016-0161863 and published US patent application US 2016/0370717A1 incorporated herein by reference in its entirety.

In order to monitor the lithographic process, parameters of the patterned substrate are measured. Parameters may include, for example, the overlay error between successive layers formed in or on the patterned substrate. This measurement may be performed on a product substrate and/or on a dedicated metrology target. There are various techniques for making measurements of the microscopic structures formed in lithographic processes, including the use of scanning electron microscopes and various specialized tools. A fast and non-invasive form of specialized inspection tool is a scatterometer in which a beam of radiation is directed onto a target on the surface of the substrate and properties of the scattered or reflected beam are measured.

Examples of known scatterometers include angle-resolved scatterometers of the type described in US2006033921A1 and US2010201963A1. The targets used by such scatterometers are relatively large, e.g., 40 μm by 40 μm, gratings and the measurement beam generates a spot that is smaller than the grating (i.e., the grating is underfilled). In addition to measurement of feature shapes by reconstruction, diffraction based overlay can be measured using such apparatus, as described in published patent application US2006066855A1. Diffraction-based overlay metrology using dark field imaging of the diffraction orders enables overlay measurements on smaller targets. Examples of dark field imaging metrology can be found in international patent applications WO 2009/078708 and WO 2009/106279 which documents are hereby incorporated by reference in their entirety. Further developments of the technique have been described in published patent publications US20110027704A, US20110043791A, US2011102753A1, US20120044470A, US20120123581A, US20130258310A, US20130271740A and WO2013178422A1. These targets can be smaller than the illumination spot and may be surrounded by product structures on a wafer. Multiple gratings can be measured in one image, using a composite grating target. The contents of all these applications are also incorporated herein by reference.

In a diffraction-based dark field metrology device, a beam of radiation is directed onto a metrology target and one or more properties of the scattered radiation are measured so as to determine a property of interest of the target. The properties of the scattered radiation may comprise, for example, intensity at a single scattering angle (e.g., as a function of wavelength) or intensity at one or more wavelengths as a function of scattering angle.

Measurement of targets in dark field metrology may comprise, for example, measuring the a first intensity of the 1st diffraction order $I+1$ and a second intensity of the $-1$st diffraction order $(I-1)$ and calculating an intensity asymmetry $(A=I+1-I-1)$, which is indicative of asymmetry in the target. The metrology targets may comprise one or more grating structures from which a parameter of interest may be inferred from such intensity asymmetry measurements, e.g., the targets are designed such that the asymmetry in the target varies with the parameter of interest. For example, in overlay metrology a target may comprise at least one composite grating formed by at least a pair of overlapping sub-gratings that are patterned in different layers of the semiconductor device. Asymmetry of the target will therefore be dependent on alignment of the two layers and therefore overlay. Other targets may be formed with structures which are exposed with different degrees of variation based on the focus setting used during the exposure; the measurement of which enabling that focus setting to be inferred back (again through intensity asymmetry).

The international patent application WO2019197117A1, incorporated herein by reference, discloses a method and metrology apparatus based on a dark field digital holographic microscope (df-DHM) to determine a characteristic, e.g., overlay, of a structure manufactured on a substrate. For the purpose of description, FIG. 3 of the international patent application WO2019197117A1 is replicated in FIG. 5. FIG. 5 schematically illustrates the disclosed df-DHM specifically adapted for use in lithographic process metrology.

The df-DHM in FIG. 5 further comprises a reference optical unit 16, 18 which is used to provide additional two reference radiation beams 51, 52 (the reference radiation). Such two reference radiation beams 51, 52 are respectively paired with two corresponding portions 41, 42 of the scattered radiation beams 31, 32 (the object radiation). The two scattered-reference beam pairs are used sequentially to form two interference patterns. Coherence control is provided by way of adjusting the relative optical path-length difference (OPD) between the two scattered-reference beams within each beam pair. However, no coherence control is available between the two beam pairs.

Due to the use of a single light source and insufficient coherence control, all four radiation beams, i.e. the first portion 41 of the scattered radiation 31, the first reference radiation 51, the second portion 42 of the scattered radiation 32 and the second reference radiation 52, are mutually coherent. If these four mutually coherent radiation beams were allowed to reach the same position of the sensor 6 at the same time, namely operating in a parallel acquisition scheme, multiple interference patterns comprising desired information containing patterns and undesired artefact-contributing patterns would overlap each other. The undesired interference patterns may be formed by interference between e.g., the portion 41 of the first scattered radiation 31 and the portion 42 of the second scattered radiation 32. Since it would be technically challenging and time consuming to completely separate the superimposed interference patterns, parallel acquisition is impractical this arrangement.

Similar to the example of FIG. 8, the use of a sequential acquisition scheme in the example of FIG. 5 allows the full NA of the objective lens to be available for both illumination and detection. However, the system suffers the same problem of low measurement speed due to sequential acquisition. Therefore, it is desirable to have a df-DHM capable of performing parallel acquisition such that a high measurement speed and a high design flexibility can be simultaneously obtained.

FIG. 6 schematically illustrates the imaging branch of a dark field digital holographic microscope (df-DHM) 1000 in accordance with an embodiment. A dark field digital holographic microscope (df-DHM) comprises an imaging branch and an illumination branch. In this embodiment, a metrology target 1060 comprising a structure on a substrate 1050 is illuminated by two illumination beams of radiation, i.e., a first illumination beam of radiation 1010 and a second illumination beam of radiation 1020. In an embodiment, such two illumination beams 1010, 1020 may simultaneously illuminate the metrology target 1060.

In an embodiment, the first illumination beam 1010 may be incident on the metrology target 1060 at a first angle of incidence in a first direction with respect to the optical axis OA. The second illumination beam 1020 may be incident on the metrology target 1060 at a second angle of incidence in a second direction with respect to the optical axis OA. The first angle of incidence of the first illumination beam 1010 and the second angle of incidence of the second illumination beam 1020 may be substantially the same. The angle of incidence of each illumination beam may be, for example in the range of 70 degrees to 90 degrees, in the range of 50 degrees to 90 degrees, in the range of 30 degrees to 90 degrees, in the range of 10 degrees to 90 degrees. The illumination of the metrology target 1060 may result in radiation being scattered from the target. In an embodiment, the first illumination beam 1010 may be incident on the metrology target 1060 at a first azimuthal angle, corresponding to the first direction. The second illumination beam 1020 may be incident on the metrology target 1060 at a second azimuthal angle, corresponding to the second direction. The first azimuthal angle of the first illumination beam 1010 and the second azimuthal angle of the second illumination beam 1020 may be different; e.g., opposing angles 180 degrees apart.

Depending on the structure of the metrology target 1060, the scattered radiation may comprise reflected radiation, diffracted radiation or transmitted radiation. In this embodiment, the metrology target may be a diffraction-based overlay target; and each illumination beam may correspond to a scattered beam comprising at least one non-zeroth diffraction order. Each scattered beam carries information of the illuminated metrology target. For example, the first illumination beam 1010 may correspond to the first scattered beam 1011 comprising the positive first diffraction order +1st DF; the second illumination beam 1020 may correspond to the second scattered beam 1021 comprising the negative first diffraction order −1st DF. The zeroth diffraction order and other undesired diffraction orders may either be blocked by a beam blocking element (not shown) or configured to completely fall outside the NA of the objective lens 1070. As a result, the df-DHM may be operated in a dark field mode. Note that, in some embodiments, one or more optical elements, e.g., a lens combination, may be used to achieve same optical effect of the objective lens 1070.

Both scattered beams 1011, 1021 may be collected by objective lens 1070 and subsequently re-focused onto an image sensor 1080. Objective lens 1070 may comprise multiple lenses, and/or df-DHM 1000 may comprise a lens system having two or more lenses, e.g., an objective lens and an imaging lens similar to the exemplary df-DHG of FIG. 5, thereby defining a pupil plane of the objective lens between the two lenses and an image plane at the focus of the imaging lens. In this embodiment, a portion 1012 of the first scattered beam 1011 and a portion 1022 of the second scattered beam 1021 are simultaneously incident at a common position of the image sensor 1080. At the same time, two reference beams of radiation, i.e. a first reference beam 1030 and a second reference beam 1040, are incident on the same position of the image sensor 1080. Such four beams may be grouped into two pairs of scattered radiation and reference radiation. For example, the first scattered-reference beam pair may comprise the portion 1012 of the first scattered beam 1011 and the first reference beam 1030. Likewise, the portion 1022 of the second scattered-reference beam pair may comprise the second scattered beam 1021 and the second reference beam 1040. These two scattered-reference beam pairs may subsequently form two interference patterns (holographic images) which at least partially overlap in spatial domain.

In an embodiment, in order to separate the two at least partially, spatially overlapping interference patterns (e.g., in the spatial frequency domain), the first reference beam 1030 may have a first angle of incidence with respect to the optical axis OA and the second reference beam 1040 may have a second angle of incidence with respect to the optical axis OA; the first angle of incidence and the second angle of incidence being different. Alternatively or in addition, the first reference beam 1030 may have a first azimuthal angle with respect to the optical axis OA and the second reference beam 1040 may have a second azimuthal angle with respect to the optical axis OA; the first and second azimuthal angles being different.

In order to generate an interference pattern, the two beams of each scattered-reference beam pair should be at least partially coherent to each other, to a degree which is sufficient to form an interference pattern. Note that each scattered radiation beam may have a phase offset with respect to its corresponding illumination radiation. For example, at the image plane of the image sensor 1080, such a phase offset may comprise contributions due to the optical path-length (OPD) from the metrology target 1060 to the image sensor 1080, and by the interaction with the metrology target.

The processing unit 1090 may be a computer system. The computer system may be equipped with an image reconstruction algorithm which is used to perform all the aforementioned tasks, comprising performing Fourier transform, extracting each individual high order spatial spectrum, performing inverse Fourier transform, calculating complex fields and determining a characteristic of the structure based on the results.

In Digital holographic microscopy, the fringe contrast varies across the detector's field of view (FOV). The main reason for this variation is due to the bandwidth of the spectrum of the light used. The reasons for this are explained in some detail in: Messinis, Christos, et al. "Impact of coherence length on the field of view in dark-field holographic microscopy for semiconductor metrology: theoretical and experimental comparisons." Applied Optics 59.11 (2020): 3498-3507 (incorporated herein by reference).

FIG. 7 illustrates this issue and shows the detector plane (defined by directions xw, yw) and one fringe (shaded, with darker region illustrating greater contrast). The fringe contrast reduces from the center of the FOV towards the edge (e.g., along β). The fringe contrast is directly proportional to the signal-to-noise ratio (SNR) of the phase measurement. Thus, the noise in the phase measurement increases at the edges of the FOV. At the extreme edges, where the contrast drops to zero, the phase cannot be measured.

Holographic microscopy arrangements will be described which address this contrast variation within the field of view. The proposed arrangements comprise varying a characteristic of the reference radiation so as to minimize variation in a contrast metric (e.g., fringe contrast of interference fringes) of a holographic image within the FOV of the holographic microscopy apparatus at the detector plane (e.g., on the camera). This may be achieved by introducing one or more suitable optical elements in the reference branch of the holographic microscopy apparatus.

In a first main embodiment, it is proposed to use a reference branch optical element which modulates the reference radiation in the reference path and thereby imposes (e.g., in combination with a tuned coherence function or spectral characteristic of the source radiation) a flat contrast response at the detector plane. In an embodiment, a further optical element may also be comprised within the illumination path to impose a flat illumination profile on the target.

FIG. 8(a) is a simplified schematic illustration of a holographic microscopy apparatus according to an embodiment. Source radiation SO comprises a Gaussian intensity profile ISO. Beamsplitter BS divides this radiation into illumination radiation or illumination beam ILL and reference radiation or reference beam REF. An illumination branch lens or illumination branch optical element Lill imposes a flat top intensity profile Iill on the illumination beam ILL; this illumination beam ILL is then directed onto a target in wafer W. The resultant scattered/diffracted radiation, object radiation or object beam OB is captured by a detection arrangement represented by objective lens OL and directed to a camera or detector DET. A reference branch lens or reference branch optical element Lref imposes an optimized intensity profile Iref on the reference beam REF, which is directed to interfere with the object beam OB at the detector DET.

The digital hologram is formed by the interference of the object beam OB and reference beams REF. The intensity distribution $I_{DHM}(x,y)$ at the detector may be described by:

$$I_{DHM}(x, y) =$$

$$I_{ref}(x, y) + I_{obj}(x, y) + 2\gamma(x, y)\sqrt{I_{ref}(x, y)I_{obj}(x, y)} \cos(\varphi_0 + k_x x + k_y y)$$

where $I_{obj}(x,y)$ is the intensity distribution of the object beam, $I_{ref}(x,y)$ is the intensity distribution of the reference beam, $\gamma(x,y)$ is the coherence function, $\varphi_0$ is the phase distribution of the object beam, $k_x$ $k_y$ are the direction vectors of the reference beam and x and y are the coordinates in the detector plane.

The last term is the contrast term which comprises three components, the amplitude distribution of the reference beam $\sqrt{I_{ref}(x,y)}$, the amplitude distribution of the object beam $\sqrt{I_{obj}(x,y)}$ and the coherence contribution $\gamma(x,y)$. The components act together to modulate the cosine term cos $(\varphi_0+k_x x+k_y y)$, such that their product defines the contrast function. It is proposed to vary characteristics of at least the reference beam such that the contrast term (product of the three components) is substantially flat over x and y (at least within the FOV), such that the contrast is substantially flat. As such, the reference branch optical element is operable to modulate the reference radiation to impose an optimized reference illumination profile which, when multiplied by a coherence contribution function of an intensity distribution of the interference pattern, results in an effective reference illumination profile with a substantially flat top.

There is less flexibility in modulating the illumination beam ILL as it is desirable that the target is illuminated homogeneously. Therefore an embodiment may comprise flattening the $I_{ill}(x,y)$ term (i.e., such that there is little illumination variation in x and y, at least on the target). Such an embodiment may comprise providing the illumination branch with an optical element Lill which imposes a flat-top profile on the illumination beam ILL, at least over a portion corresponding to the target.

FIG. 8(b) illustrates a possible design of an illumination branch optical element Lill which can create such a flat top response Iill on source radiation comprising a Gaussian source beam ISO at a fixed distance. It can be seen in the Figure that the input ray distribution is Gaussian and the output distribution flat. The lens like optical element Lill has a focus-like location where the light is concentrated. A pinhole PH may be optionally located here to further filter and smoothen the beam.

As the illumination profile $I_{ill}(x,y)$ is made flat in this embodiment (and therefore there is no contrast compensation on the object beam), it is proposed that the contrast flattening is performed by creating an optimized intensity distribution $I_{ref}(x,y)$ in the reference beam REF which compensates for the contrast variation. In an embodiment, the optimized intensity distribution $I_{ref}(x,y)$ may comprise or resemble a 1D cross-section through a diameter of an annular profile; i.e., it has higher amplitude at regions at each end (or peripheral region) of the distribution (e.g., equidistant from a distribution center), with the amplitude lowering gradually towards the center of the distribution. Such a distribution should comprise an inverse of the distribution illustrated by the shading of FIG. 7, within the FOV along the line labeled B.

In an embodiment, the coherence contribution $\gamma(x,y)$ is co-optimized with the intensity distribution $I_{ref}(x,y)$, to tune the contrast flattening based on the central wavelength, thereby improving the contrast flattening.

FIG. 8(*c*) illustrates a possible design of a reference branch optical element Lref which can create such a suitable response Iref on a Gaussian source beam ISO. The optical element Lref has a surface sag (on the input side) and provides a high spherical aberration which causes the central rays to focus before the marginal rays. The central rays thus end up at the periphery of the image plane. In order to optimize the lens profile, a lens design program can be used. The lens profile can be calculated by 'targeting' the rays from a Gaussian input to a coherence flattening shape (desired distribution). The resultant optimized distribution shape is illustrated by the plot of amplitude versus position (x or y) in the Figure.

The coherence contribution term $\gamma(x,y)$ has a Gaussian distribution for a Gaussian shaped spectrum. The width of the Gaussian is inversely proportional to the bandwidth of the spectrum. The shape of $\gamma(x,y)$ can thus be tuned by changing the spectrum. As such, the proposed arrangement and method may further comprise tuning the spectrum (e.g., tuning the source bandwidth) appropriately for the optimized intensity distribution $I_{ref}(x,y)$. The tuning of the bandwidth may be achieved, for example, by a tunable color filter or AOTF (acousto-optical tunable filter) on the source radiation.

Figure 9:
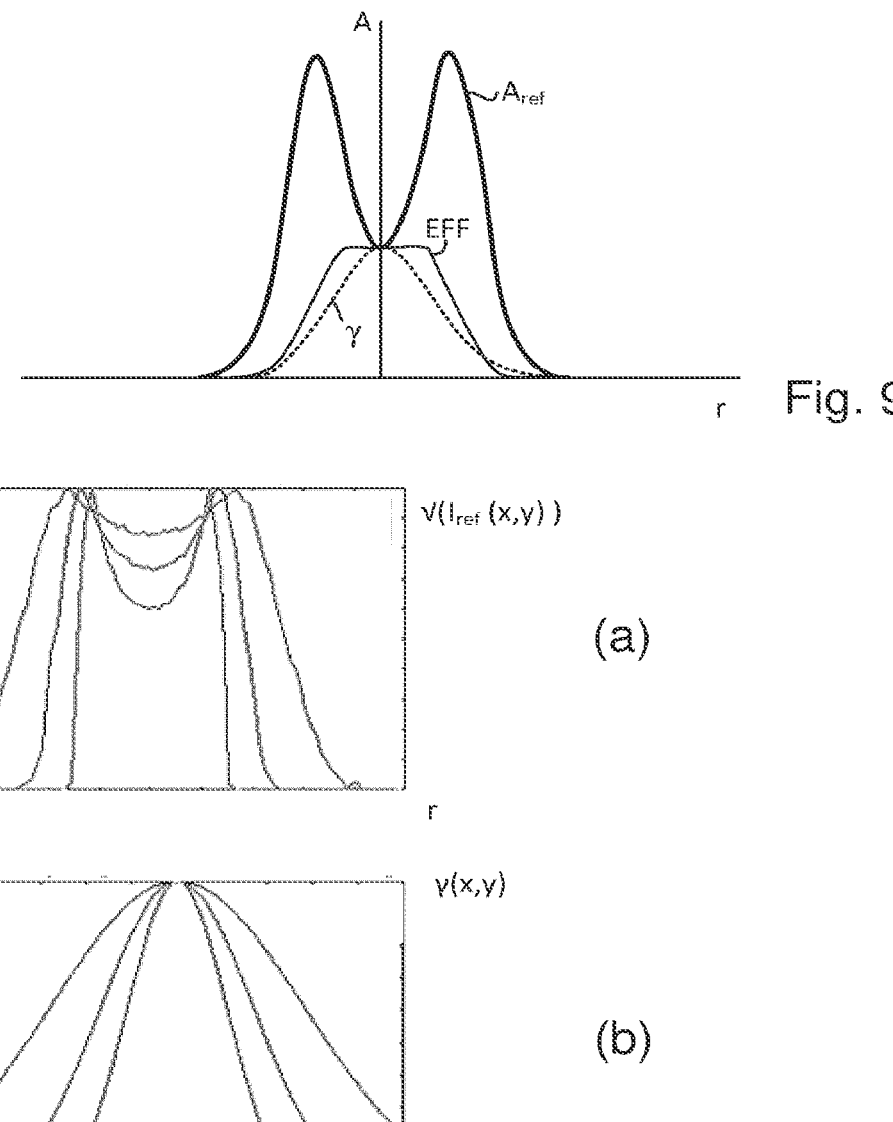
FIG. 9 is a graph of profile amplitude versus detector plane position r, showing a first plot describing a reference beam amplitude distribution corresponding to an optimized distribution imposed by the optical element of FIG. 8(*c*), a second plot describes the Gaussian coherence contribution term and a combined plot of the product of the first and second plots.

FIG. 9 is a plot of profile amplitude A versus spatial position r on the detector plane. A first plot Aref describes a reference beam amplitude distribution (i.e., $\sqrt{I_{ref}(x,y)}$) corresponding to an optimized distribution imposed by optical element Lref. A second plot y describes the Gaussian coherence contribution term $\gamma(x,y)$. The term $\sqrt{I_{ref}(x,y)}$ describes a shape which aims to impose a substantially flat top distribution when multiplied by a Gaussian function. The result is an effective illumination profile EFF which has a substantially flat or flattened top.

Figure 10:
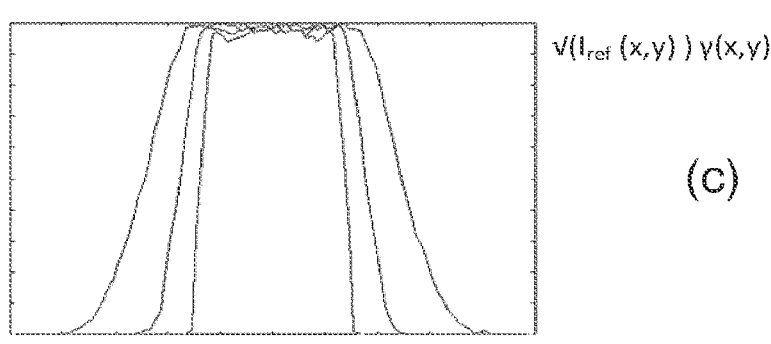
FIG. 10 shows graphs comprising (a) a graph of profile amplitude versus detector plane position describing a reference beam amplitude distribution corresponding to an optimized distribution for three central wavelengths, (b) a plot describing the Gaussian coherence contribution term for the three central wavelengths, and (c) a combined plot of the product of the plots of FIGS. 10(*a*) and 10(*b*) for the three central wavelengths.

It should be noted that the bandwidth may be tuned according to the central wavelength of the source radiation. FIG. 10(*a*) shows a plot of amplitude distribution $\sqrt{I_{ref}(x,y)}$ versus spatial position on the detector plane r for three central wavelengths $\lambda 1$, $\lambda 2$, $\lambda 3$ and FIG. 10(*b*) shows a plot of the coherence function $\gamma(x,y)$ for the for the three central wavelengths $\lambda 1$, $\lambda 2$, $\lambda 3$. The coherence function $\gamma(x,y)$ (width of the Gaussian) can be changed for each wavelength by tuning the bandwidth around the central wavelength. The width of the coherence function is inversely proportional to the bandwidth. FIG. 10(*c*) is a plot of the product of the coherence function and the intensity distribution generated by the lens. The result is a substantially flat profile for each of the three central wavelengths $\lambda 1$, $\lambda 2$, $\lambda 3$.

While the optical elements Lref and Lill are each described as being particularly configured lenses, in either or both cases alternative elements may be used to obtain a desired intensity distribution, such as an amplitude mask.

In a second main embodiment, a further (off-axis) holographic microscopy apparatus will be described, which may be implemented within metrology devices such as illustrated in FIG. 5 or 6, for example. In the case of the device of FIG. 6, two illumination beams are used in parallel. These illumination beams generate a +1st order and −1st order diffraction image, respectively, on the camera. For each image, a different reference beam is used, with a non-zero angle with respect to the xz-plane, thereby creating the interference patterns on the camera, which can be distinguished by their different fringe directions.

Figure 11:
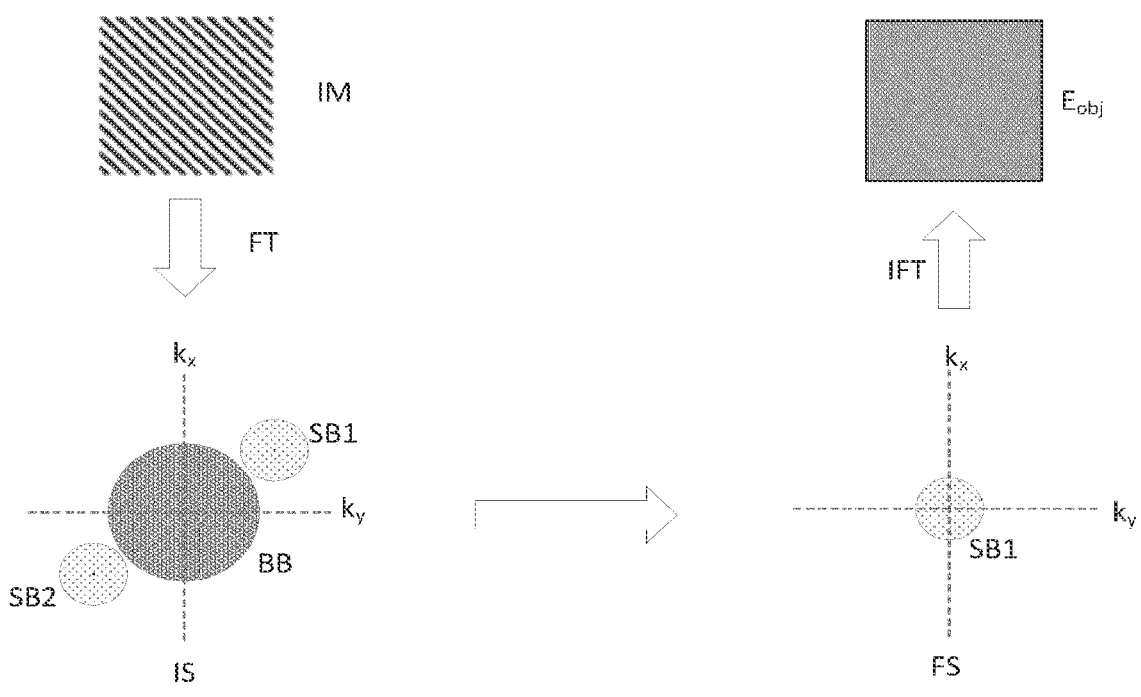
FIG. 11 is a flow diagram of a known hologram processing method.

To help understand the principles behind this embodiment, FIG. 11 is a flow diagram illustrating the extraction of the amplitude and phase of a diffraction image (e.g., +1st order) from the interference pattern. The camera image IM is Fourier transformed FT (two-dimensional Fourier transform) into an image spectrum IS in the spatial frequency domain. This image spectrum IS comprises a base spatial spectrum or base band BB comprising zeroth order Fourier components and two (identical) high order spatial spectra or sidebands SB1, SB2. Where the −1 order is captured simultaneously, the −1st order interference pattern will have a different fringe angle such that its sidebands will end up at different locations in the spectrum, and can therefore can be separated.

The center of the base spectrum is the origin O of the spatial frequency coordinate. The position of the base spectrum is fixed. However, position of the high order spatial spectra can be adjusted with respect to the base spectrum, by, for example, changing the incident angle $\theta_{ref}$ and/or azimuthal angle $\phi_{ref}$ of the or each reference beam. Referring to FIG. 6, the radial distance between the center of each high order spatial spectrum and the center of the base spatial spectrum is related to the angle between the optical axis of the portion of scattered beam 1012 or 1022 and the optical axis of the reference beam 1030 or 1040. The distance separating these high order spatial spectra from the base spatial spectrum increases with this angle. Hence, by providing a sufficiently large angle between the axis of a portion of a scattered beam and the axis of a reference beam, the high order spatial spectra SB1, SB2 can be completely separated from the base spatial spectrum BB. However, the angle of the reference beam cannot be arbitrarily high. It is limited by the pixel pitch of the image sensor 1080. The fringes in the hologram (or interference pattern) should be sampled adequately by the sensor pixels. The largest frequency in the hologram should fulfill the Nyquist criterion of sampling.

Moreover, the azimuthal angle of each reference beam has an impact on the circumferential position of a spatial spectrum with respect to the origin O. The circumferential position of a high order spatial spectrum is represented by an angle between the high order spatial spectrum and the spatial frequency axis kx. For example, the circumferential position of the first high order spatial spectrum is represented by the angle.

Referring back to FIG. 11, one of the high order spatial spectra (e.g., SB1) is selected and centered on the origin, to obtain filtered spectrum FS. This is then subjected to inverse Fourier transform IFT to obtain the (complex) object field Eobj. This complex field can then be used to determine a characteristic of the structure of the metrology target.

To create a high intensity, allow tunability of the source, and avoid speckle, one common solution is to use a bright wideband source which is filtered to a few nanometers bandwidth using a tunable color filter or AOTF. This limits the coherence length to, for example, around 50 µm.

In a dark-field holographic microscope, the illumination beam may enter at a high angle, and, because of the resultant high angle diffraction, there may be a large time delay between two sides of the sample, with a linear variation of the time delay, or optical path length to the source, in between. Interference of the diffracted beam with the reference beam on the detector camera only takes place within the temporal coherence length (coherence time). Typically, at the center of the field, the optical path lengths of the diffracted beam and the reference beam may be matched for maximum contrast. As a result of the time delay variation, there will be a tilt of the plane of maximum coherence (plane with equal path length of measurement and reference beam to the source), leading to a loss of coherence, or interference contrast, over the image of the target. This effect leads to a limited Field of View which has sufficient fringe contrast, this contrast being a function of the bandwidth, as described by the aforementioned Messinis et al.

In existing off-axis holographic dark field (e.g., diffraction based overlay DBO or diffraction based focus DBF) metrology methods, the bandwidth is limited given the required FOV and the effect described above.

In bright field white light off axis holography, a similar effect is known, where the FOV is limited due to the off-axis angle of the reference beam. A possible solution is discussed by Slabý et al. in "Off-Axis Setup Taking Full Advantage of Incoherent Illumination in Coherence-Controlled Holographic Microscope." Optics Express 21, no. 12 (Jun. 17, 2013): 14747 (incorporated herein by reference). This describes a bright field off-axis holographic interferometer using a grating to generate the reference beam. This grating solution cannot be used directly in a dark field context, since it only addresses the effect of the off-axis tilt of the reference beam, and not the tilt of the plane of constant optical path length observed in the measurement beam (which contains the image) of dark-field off-axis holography.

It is therefore proposed in this embodiment to use optical elements such as one or more gratings mirrors in combination with one or more prisms and/or lenses which have specific properties to address the FOV limiting effects within the design constraints for a dark field microscope. More specifically, these effects comprise the effect resultant from the tilt of the plane of constant optical path length to the source for the dark field images, and the effect of using an off-axis reference beam.

In more detail, there are two conflicting requirements. A first requirement may be described by first defining for each of illumination beams and corresponding diffracted dark field images, the 'virtually projected zeroth order beam'. This may be defined as the beam which results from specular reflection, not diffraction, on each of the gratings, and would be projected to the camera if it were not blocked by any aperture, or limited by the maximum diameter of any of the optical elements/lenses (e.g., the objective) which direct the object beam to the detector. The plane of constant path length to the source is perpendicular to the direction of the virtually projected zeroth order beam for all (non-zero) diffraction orders. This effect holds equally for transmission through a grating, for reflection and for diffraction.

Figure 12:
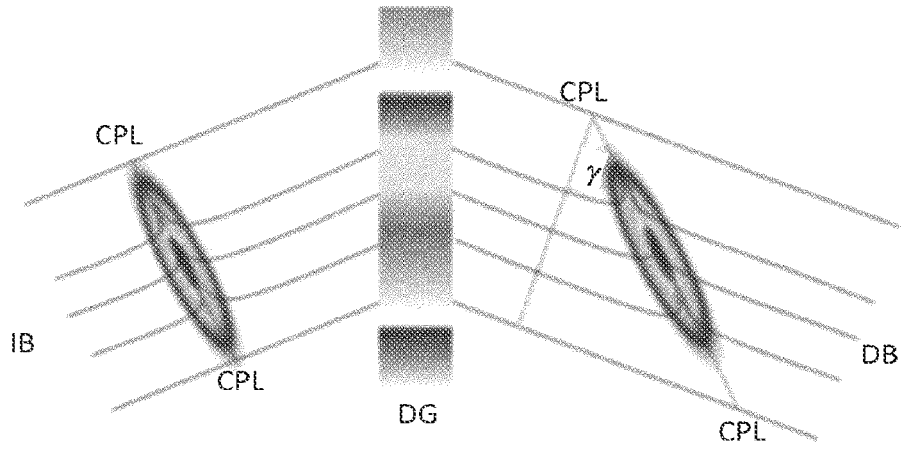
FIG. 12 illustrates the effect of diffraction on a phase front or plane of constant path length to source.

FIG. 12 illustrates this point. It shows an input beam IB incident on a (transmission) diffraction grating DG and a resultant diffracted beam DB. The plane CPL of the 'phase front', which has a constant path length to the source is perpendicular to the input beam IB, but tilted (by angle γ) for the diffracted beam DB. The plane CPL of the phase front of the diffracted beam DB is perpendicular to the direction of the zeroth order which is same as that of the input beam IB.

In order to have a workable FOV at the detection camera, the angle between the reference beam and the virtually projected zeroth order of the illumination beam should be sufficiently small. From equation (A21) in the paper by Messinis et al., it can be shown that this FOV requirement can be formulated as:

$$\left| \frac{\sin(\theta_{ill})\vec{p}_{ill}}{M} - \sin(\theta_{ref})\vec{p}_{ref} \right| < \frac{\lambda_c^2}{FOV \cdot BW}$$

where $\sin(\theta_{ill})\vec{p}_{ill}$ describes the direction of the virtually projected zeroth order illumination beam ($\vec{p}_{ill}$ is an in-plane (parallel) unit vector for the illumination) and $\sin(\theta_{ref})\vec{p}_{ref}$ describes the direction of the reference beam, or in the context of this embodiment (see below) the virtually projected zeroth order reference beam following diffraction in the reference arm ($\vec{p}_{ref}$ is an in-plane (parallel) unit vector for the reference). $\lambda_c$ is the central wavelength, $\theta_{ill}$ is the illumination angle, $\theta_{ref}$ is the reference angle, M is the imaging system magnification and BW is the source bandwidth. For typical values (e.g. $\lambda_c$=500 nm, FOV=50 µm, BW=5 nm) the right hand term is of the order of 1, giving a maximum separation of 1 in NA, or $\sin(\theta)$, coordinates.

The second requirement is that, to be able to analyze the sideband(s) in the Fourier transform, they have to be separate in Fourier space from the base band for each of the illumination conditions as shown in FIG. 11. To separate the illumination conditions, the sidebands for the individual illumination beams and their corresponding reference beam should not overlap either. For the reference beam(s) this translates into two requirements:

in the pupil plane of the camera image, the reference beams are at least 3 times further from the pupil center than the de-magnified NA/M of the detection lens; and in the pupil plane of the camera, at least one of the reference beams is shifted at least partly in a direction orthogonal to the pitch direction of the measured grating, such that the side bands are off-axis with respect to the grating pitch direction.

These non-overlap requirements can be formulated as:

$$\sin(\theta_{ref}) > 3\frac{NA}{M}; \text{and}$$

for a system where the two illumination beams and reference beams are arrange anti-symmetric with respect to the plane orthogonal to the grating pitch direction (the skilled person can readily adapt this for other setups):

$$\sin(\phi_{ref})\sin(\theta_{ref}) > \frac{NA}{M}$$

Figure 13:
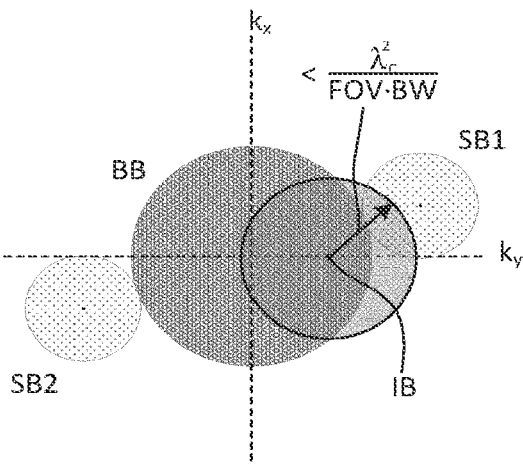
FIG. 13 depicts (a) a Fourier transformed image in the spatial frequency domain illustrating a Field of View condition for the reference beam direction; (b) the Fourier transformed image in the spatial frequency domain illustrating a non-overlap condition for the reference beam direction; and (c) the combination of the conditions illustrated in FIGS. 13(*a*) and 13)
Figure 13:
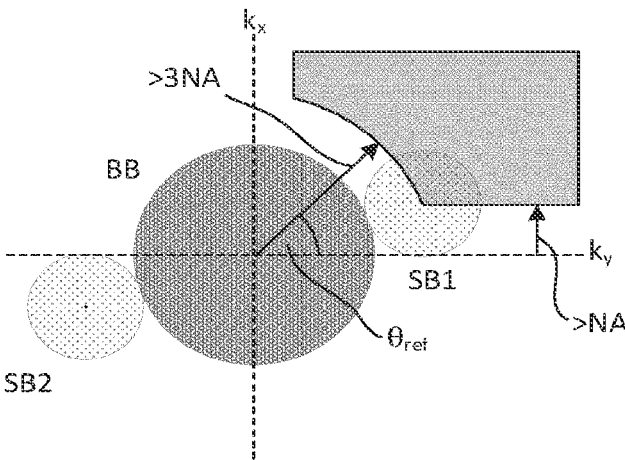
Figure 13:
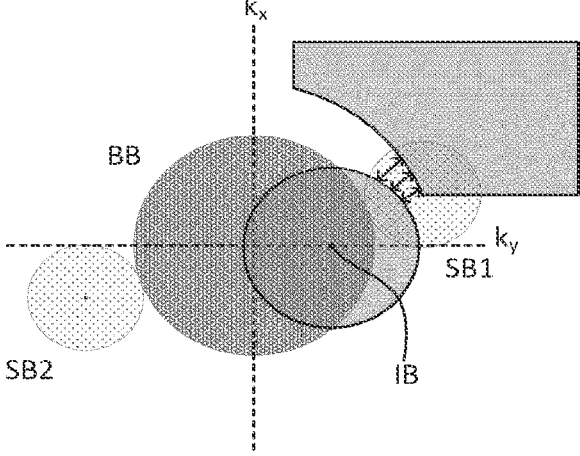

FIG. 13 illustrates that, for a typical setup, e.g. a detection NA of 0.7 and illumination $\sin(\theta_{ill})$, of 0.85, these conditions do not overlap but leave a gap in NA (angular) space. FIG. 13(a) illustrates the FOV requirement. The black dot IB represents the virtually projected zeroth order illumination beam. The aforementioned FOV requirement dictates that the direction of the reference beam (or virtually projected zeroth order reference beam) in the camera pupil plane must be within the gray shaded area centered on this dot IB. In FIG. 13(b), the gray shaded area is the area in the camera pupil plane allowed for the direction of the reference beam respecting the non-overlap requirement. FIG. 13(c) shows both of these requirements together. As can be seen, there is no overlap between these two shaded regions which would indicate allowable angles for the reference beam which meet the two conditions; instead there is a gap (indicated by double headed arrows in the Figure).

To address the problem of these conflicting requirements, it is proposed to provide a reference branch optical element in the form of a diffractive structure or grating in the branch of the reference beam. This grating diffracts the reference beam thereby changing the angle of its phase front (plane of constant path length to source) so as to be more parallel to the phase front of the object beam at the detector. This may be achieved by configuring the tool such that the angle between the virtual zeroth order object beam and virtual zeroth order reference beam is minimized at the detector (e.g., such that they are parallel or near-parallel). The result of this is the plane of maximum contrast at the detector will be parallel (or more parallel) with the detector plane (within the FOV) resulting in a flattened contrast term; i.e., the optical path length difference between object and reference beams is minimized over the whole camera plane (at least) within the FOV. It can be seen from the FOV condition inequality recited above that a minimal angle between the virtual beams means that the FOV and/or bandwidth of the source can be increased.

This grating may be used in combination with one or more other beam steering elements (e.g., one or more other reference branch optical elements such as mirrors, lenses and/or wedges) in the reference branch such that the second condition is also met. More specifically, for each of the reference beams, corresponding to different simultaneously operated illumination modes, one or more gratings and one or more beam steering elements in the reference branch are provided such that:

the (virtual) projection of the zeroth order diffraction from the one or more grating(s) in the reference branch, meets the FOV requirement, as depicted in FIG. 13(a);

the actual beam directions diffracted from the one or more grating(s) in the reference branch meet the non-overlap requirements as depicted in FIG. 13(b).

These requirements should be met across the wavelength range of interest.

Figure 14:
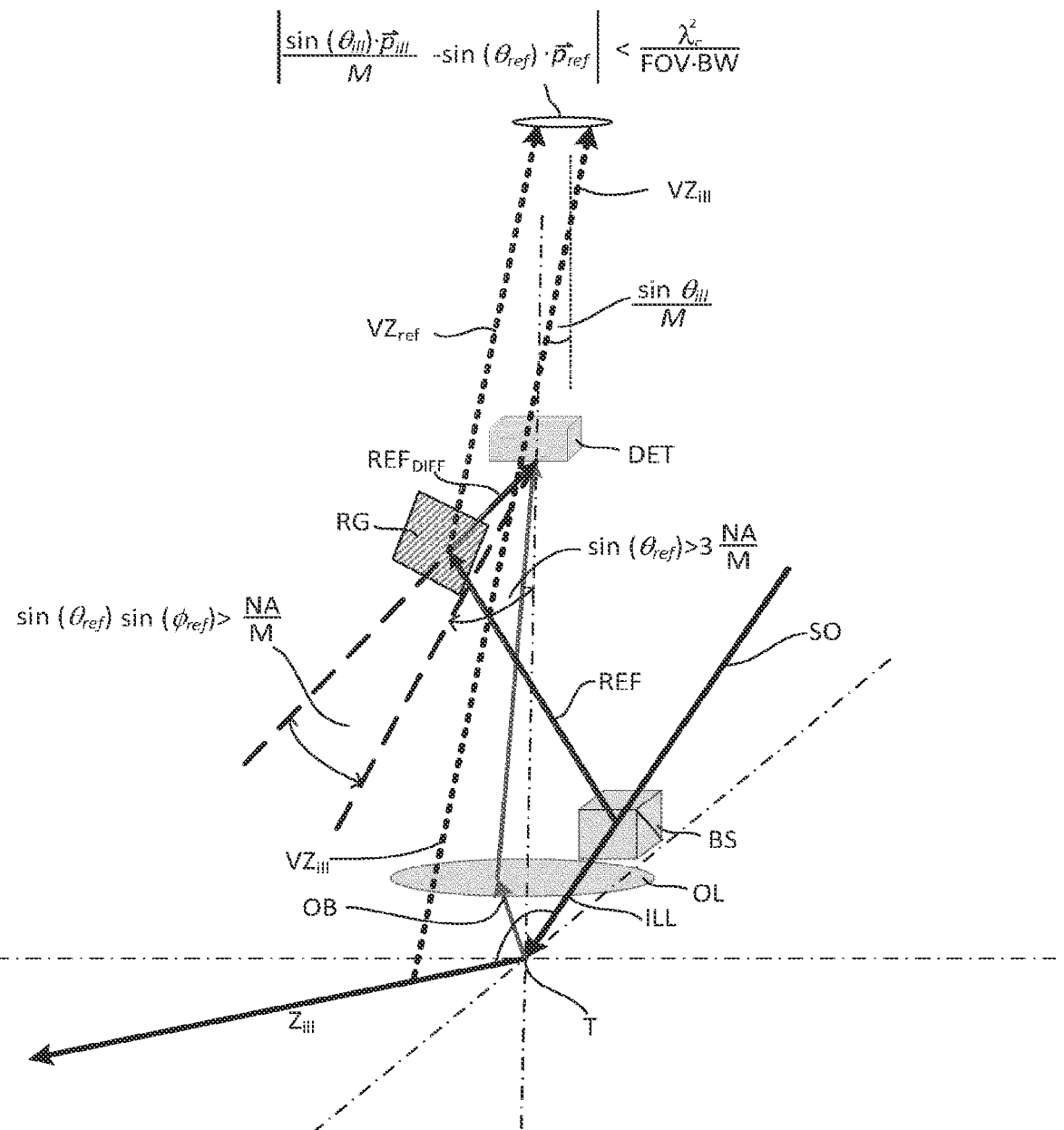
FIG. 14 depicts schematically a second dark field digital holographic microscope, in accordance with an embodiment.

FIG. 14 is a simplified schematic drawing of a dark field holography metrology apparatus according to this embodiment. Source radiation or a source beam SO is split by beamsplitter BS into illumination radiation or illumination beam ILL and reference radiation or reference beam REF. The illumination beam is diffracted by target T, resulting in diffracted radiation, object radiation or object beam OB (e.g., a first diffraction order). This is captured by objective lens OL and directed to detector DET. An illumination virtual zeroth order beam $VZ_{ill}$ is drawn, representing the zeroth order beam $Z_{ill}$, specularly reflected from the target, if it had been captured by objective lens OL and directed to detector DET.

The reference beam REF is directed towards a reference grating RG, which diffracts the reference beam REF. The diffracted reference beam $REF_{DIFF}$ is directed to the detector DET to interfere with the diffracted object beam OB. A reference virtual zeroth order beam $VZ_{ref}$ is drawn, representing the specularly reflected zeroth order beam from reference grating RG.

The FOV condition is met by minimizing the angle between the illumination virtual zeroth order beam and the reference virtual zeroth order beam $VZ_{ref}$, e.g., here they are parallel. Similarly the beam steering elements within the reference branch (here symbolized as part of beam splitter BS, although additional optical elements will likely be comprised within the reference branch for this purpose) in combination with the reference grating are configured to guide the reference beam so as to ensure that the non-overlap conditions are met. These conditions are shown on the drawing.

In different embodiments, it is proposed to combine some or all of the techniques used respectively in the first embodiment and the second embodiment (as described above) so as to simultaneously obtain a flatter contrast response at the detector plane, a larger FOV and individually separate high order spatial spectra in a Fourier space representation of an image of an interference pattern formed by the object beam OB and reference beam REF. For example, in the embodiment shown in FIG. 14, a reference branch optical element (e.g., the optical element shown in FIG. 8(c)) may be comprised to spatially modulate the reference beam REF so as to impose a desired reference illumination profile. Alternatively or in addition, a further optical element (e.g., the optical element shown in FIG. 8(b)) may also be comprised within the illumination path to impose a flat illumination profile on the target. Alternatively or in addition, a further optical element (e.g., a tunable color filter or AOTF) may also be comprised to tune the bandwidth around the central wavelength of the reference beam REF and illumination beam ILL so as to change the width of the coherence function $\gamma(x,y)$ (e.g., the width of a Gaussian function).

In summary, methods and apparatuses are disclosed herein which provide a flatter or substantially contrast over the FOV and increased SNR of the hologram. In addition, the FOV can be increased to a desired size. Also, the source bandwidth can be increased significantly to boost intensity.

In addition, for embodiments which use a grating to tilt the reference beam, the fringe frequency becomes more constant over wavelength. This can be an advantage for the resolution requirements of the camera.

Further embodiments are disclosed in the subsequent first list of numbered clauses:

1. A dark field digital holographic microscope configured to determine a characteristic of interest of a structure, comprising:

an illumination branch for providing illumination radiation to illuminate said structure;

a detection arrangement for capturing object radiation resulting from diffraction of the illumination radiation by said structure;

a reference branch for providing reference radiation for interfering with the object beam to obtain an image of an interference pattern formed by the illumination radiation and reference radiation; and at least one reference branch optical element operable to modulate the reference radiation to impose an optimized reference illumination profile which, when multiplied by a coherence contribution function of an intensity distribution of the interference pattern, results in an effective reference illumination profile with a substantially flat top so as to reduce and/or reduce and/or minimize spatial variation in a contrast metric of the image within a field of view of the dark field digital holographic microscope at a detector plane.

2. A microscope as defined in clause 1, wherein the contrast metric comprise a fringe contrast of interference fringes within the image.

3. A microscope as defined in clause 1 or 2, wherein the optimized reference illumination profile comprises a peak intensity at each of corresponding peripheral regions along one direction of the detector plane corresponding to the direction of the spatial variation in the contrast metric being reduced and/or minimized.

4. A microscope as defined in clause 3, wherein the at least one reference branch optical element comprises a lens element having a high spherical aberration which causes central rays to focus before marginal rays so as to form the optimized reference illumination profile.

5. A microscope as defined in any of clauses 1 to 4, wherein said reference radiation and illumination radiation has a bandwidth optimized to increase a width of the coherence contribution function so as to further reduce and/or minimize spatial variation in the contrast metric.

6. A microscope as defined in clause 5, comprising a tunable color filter or acousto-optical tunable filter for optimizing said bandwidth.

7. A microscope as defined in any preceding clause, wherein the illumination branch comprises an illumination branch optical element, wherein said illumination branch optical element and said reference branch optical element are co-optimized for minimizing said spatial variation in a contrast metric.

8. A microscope as defined in clause 7, wherein the illumination branch optical element is operable to impose a substantially homogeneous illumination intensity or amplitude distribution on the illumination radiation.

9. A microscope as defined in any preceding clause, wherein the at least one reference branch optical element comprises a diffractive structure operable to diffract the reference radiation thereby changing the angle of its phase front so as to be more parallel to a phase front of the object radiation at the detector plane.

10. A microscope as defined in clause 9, wherein said diffractive structure is operable to diffract the reference radiation such that an angle between a first phase front comprising the phase front of the object beam and a second phase front comprising the phase front of the reference beam at the detector plane is less than the central wavelength of the illumination and reference radiation squared divided by the product of the field of view and the bandwidth of said illumination and reference radiation.

11. A microscope as defined in clause 10, wherein said diffractive structure is operable to diffract the reference beam such that the angle between the first phase front and second phase front is reduced and/or minimized.

12. A microscope as defined in any of clause 9 to 11, wherein said diffractive structure is operable to direct the reference radiation to the detector plane so as to interfere with the object radiation such that an optical path length difference to source between the object radiation and the reference radiation is maintained smaller than a coherence length of the illumination radiation over the whole field of view at the detector plane.

13. A microscope as defined in any of clauses 9 to 12, wherein the reference branch further comprises one or more beam steering elements operable to steer the reference radiation in combination with said diffractive structure such that high order spatial spectra are separate from a base spatial spectrum in a Fourier space representation of the image.

14. A microscope as defined in clause 13, wherein said one or more beam steering elements is operable to steer the reference radiation in combination with said diffractive structure such that in a pupil plane of the detector plane:

the reference radiation is at least three times further from a pupil center of the pupil plane than a de-magnified numerical aperture of the detection arrangement; and
at least one beam of the reference radiation is shifted at least partly in a direction orthogonal to a pitch direction of the structure, such that the high order spatial spectra are off-axis with respect to said pitch direction.

15. A microscope as defined in any preceding clause, wherein said reference radiation and illumination radiation are derived from a single radiation source.

16. A microscope as defined in clause 15, comprising a bandwidth optimized to optimize a coherence metric of source radiation output from said single radiation source and used to provide said reference radiation and illumination radiation.

17. A microscope as defined in any preceding clause, operable to direct a first beam of said illumination radiation so as to illuminate said structure from a first direction and to direct a second beam of said illumination radiation so as to illuminate said structure from a second direction, said second direction being different to said first direction.

18. A microscope as defined in clause 17, further comprising a sensor, and being operable to simultaneously capture on a detector at said detector plane:

a first image of a first interference pattern resulting from interference between a first beam of said object radiation corresponding to said first beam of said illumination radiation and a first beam of said reference radiation, and
a second image of a second interference pattern resulting from interference between a second beam of said object radiation corresponding to said second beam of said illumination radiation and a second beam of said reference radiation.

19. A method for determining a characteristic of interest of a structure on a substrate comprising:

providing illumination radiation to illuminate said structure;
capturing object radiation resulting from diffraction of the illumination radiation by said structure;
providing reference radiation for interfering with the object beam to obtain an image of an interference pattern formed by the illumination radiation and reference radiation; and
modulating the reference radiation to impose an optimized reference illumination profile which, when multiplied by a coherence contribution function of an intensity distribution of the interference pattern, results in an effective reference illumination profile with a substantially flat top so as to reduce and/or minimize spatial variation in a contrast metric of the image within a field of view at a detector plane.

20. A method as defined in clause 19, wherein the contrast metric comprises a fringe contrast of interference fringes within the image.

21. A method as defined in clause 20, wherein the optimized reference illumination profile comprises a peak intensity at each of corresponding peripheral regions along one direction of the detector plane corresponding to the direction of the spatial variation in the contrast metric being reduced and/or minimized.

22. A method as defined in any of clauses 19 to 21, comprising optimizing a coherence metric of source radiation used to provide said reference radiation and illumination radiation so as to further reduce and/or minimize spatial variation in the contrast metric.

23. A method as defined in clause 22, wherein said step of optimizing a coherence metric comprises optimizing a bandwidth of the source radiation to increase a width of the coherence contribution function.

24. A method as defined in clause 23, wherein said optimizing a bandwidth of the source radiation comprises optimizing said bandwidth based on one or both of: the optimized reference illumination profile and a central wavelength of the source radiation.

25. A method as defined in any of clauses 19 to 24, comprising co-optimizing an illumination profile of said illumination radiation and said reference illumination profile to reduce and/or minimize said spatial variation in the contrast metric.

26. A method as defined in any of clauses 19 to 25, comprising imposing a substantially homogeneous illumination intensity or amplitude distribution on the illumination radiation.

27. A method as defined in any of clauses 19 or 26, comprising diffracting the reference radiation thereby changing the angle of its phase front so as to be more parallel to a phase front of the object radiation at the detector plane.

28. A method as defined in clause 27, wherein said diffraction of the reference radiation is such that an angle between a first phase front comprising the phase front of the object beam and a second phase front comprising the phase front of the reference beam at the detector plane is less than a central wavelength of source radiation used to provide said reference radiation and illumination radiation squared and divided by the product of the field of view and the bandwidth of said source radiation.

29. A method as defined in clause 28, wherein said diffraction of the reference beam is such that the angle between the first phase front and the second phase front is reduced and/or minimized.

30. A method as defined in any of clause 27 to 29, wherein said diffraction of the reference beam comprises directing the reference radiation to the detector plane so as to interfere with the object radiation such that an optical path length difference to source between the object radiation and the reference radiation is maintained smaller than a coherence length of the illumination radiation over the whole field of view at the detector plane.

31. A method as defined in any of clauses 27 to 30, comprising steering the reference radiation such that high order spatial spectra are separate from a base spatial spectrum in a Fourier space representation of the image.

32. A method as defined in clause 31, wherein said steering of the reference radiation is such that in a pupil plane of the detector plane:

the reference radiation is at least three times further from a pupil center of the pupil plane than a de-magnified numerical aperture of detection optics used to capture said object radiation; and at least one beam of the reference radiation is shifted at least partly in a direction orthogonal to a pitch direction of the structure, such that the high order spatial spectra are off-axis with respect to said pitch direction.

33. A method as defined in any of clauses 19 to 32, comprising directing a first beam of said illumination radiation so as to illuminate said structure from a first direction and to directing a second beam of said illumination radiation so as to illuminate said structure from a second direction, said second direction being different to said first direction.

34. A method as defined in clause 33, comprising simultaneously capturing at said detector plane:

a first image of a first interference pattern resulting from interference between a first beam of said object radiation corresponding to said first beam of said illumination radiation and a first beam of said reference radiation, and a second image of a second interference pattern resulting from interference between a second beam of said object radiation corresponding to said second beam of said illumination radiation and a second beam of said reference radiation.

35. A dark field digital holographic microscope configured to determine a characteristic of interest of a structure, comprising:

an illumination branch for providing illumination radiation to illuminate said structure;

a detection arrangement for capturing object radiation resulting from diffraction of the illumination radiation by said structure;

a reference branch for providing reference radiation for interfering with the object beam to obtain an image of an interference pattern formed by the illumination radiation and reference radiation; and a diffractive structure operable to diffract the reference radiation thereby changing the angle of its phase front so as to be more parallel to a phase front of the object radiation at the detector plane.

36. A microscope as defined in clause 35, wherein said diffractive structure is operable to diffract the reference radiation such that an angle between a first phase front comprising the phase front of the object beam and a second phase front comprising the phase front of the reference beam at the detector plane is less than the central wavelength of the illumination and reference radiation squared divided by the product of the field of view and the bandwidth of said illumination and reference radiation.

37. A microscope as defined in clause 36, wherein said diffractive structure is operable to diffract the reference beam such that the angle between the first phase front and second phase front is reduced and/or minimized.

38. A microscope as defined in any of clause 35 to 37, wherein said diffractive structure is operable to direct the reference radiation to the detector plane so as to interfere with the object radiation such that an optical path length difference to source between the object radiation and the reference radiation is maintained smaller than a coherence length of the illumination radiation over the whole field of view at the detector plane.

39. A microscope as defined in any of clauses 35 to 38, wherein the reference branch further comprises one or more beam steering elements operable to steer the reference radiation in combination with said diffractive structure such that high order spatial spectra are separate from a base spatial spectrum in a Fourier space representation of the image.

40. A microscope as defined in clause 39, wherein said one or more beam steering elements is operable to steer the reference radiation in combination with said diffractive structure such that in a pupil plane of the detector plane:

the reference radiation is at least three times further from a pupil center of the pupil plane than a de-magnified numerical aperture of the detection arrangement; and at least one beam of the reference radiation is shifted at least partly in a direction orthogonal to a pitch direction of the structure, such that the high order spatial spectra are off-axis with respect to said pitch direction.

41. A dark field digital holographic microscope configured to perform the method of any of clauses 19 to 34.

42. A metrology apparatus for determining a characteristic of interest of a structure on a substrate comprising a dark field digital holographic microscope as defined in any of clauses 1 to 18, or clauses 35 to 41.

43. An inspection apparatus for inspecting a structure on a substrate comprising a dark field digital holographic microscope as defined in any of clauses 1 to 18, or clauses 35 to 41.

Further embodiments have been defined in the following second numbered list of clauses, wherein the clauses are numbered according to the Roman numeral system:

i. A dark field digital holographic microscope configured to determine a characteristic of interest of a structure, comprising:

an illumination branch for providing illumination radiation to illuminate said structure;

a detection arrangement for capturing object radiation resulting from diffraction of the illumination radiation by said structure;

a reference branch for providing reference radiation for interfering with the object beam to obtain a holographic image; and at least one reference branch optical element operable to vary a characteristic of the reference radiation so as to reduce and/or reduce and/or minimize spatial variation in a contrast metric of the holographic image within a field of view of the dark field digital holographic microscope at a detector plane.

ii. A microscope as defined in clause i, wherein the contrast metric comprise a fringe contrast of interference fringes within the holographic image.

iii. A microscope as defined in clause i or ii, wherein the at least one reference branch optical element is operable to modulate the reference radiation to impose an optimized reference illumination profile, and wherein, optionally, the optimized reference illumination profile comprises a peak intensity at each of corresponding peripheral regions along one direction of the detector plane corresponding to the direction of the spatial variation in the contrast metric being reduced and/or minimized.

iv. A microscope as defined in clause iii, wherein the at least one reference branch optical element comprises a lens element having a high spherical aberration which causes central rays to focus before marginal rays.

v. A microscope as defined in any of clauses iii to iv, wherein said reference radiation and illumination radiation has a bandwidth optimized to further reduce and/or minimize spatial variation in the contrast metric.

vi. A microscope as defined in any of clauses iii to v, wherein the illumination branch comprises an illumination branch optical element, wherein said illumination branch optical element and said reference branch optical element are co-optimized for minimizing said spatial variation in a contrast metric, and wherein, optionally, the illumination branch optical element is operable to impose a substantially homogeneous or more homogeneous illumination intensity or amplitude distribution on the illumination radiation.

vii. A microscope as defined in clause i or ii, wherein the at least one reference branch optical element comprises a diffractive structure operable to diffract the reference radiation thereby changing the angle of its pulse front so as to be more parallel to a pulse front of the object radiation at the detector plane.

viii. A microscope as defined in clause vii, wherein said diffractive structure is operable to diffract the reference radiation such that an angle between a first pulse front comprising the pulse front of the object beam and a second pulse front comprising the pulse front of the reference beam at the detector plane is less than the central wavelength of the illumination and reference radiation squared divided by the product of the field of view and the bandwidth of said illumination and reference radiation, and wherein, optionally, said diffractive structure is operable to diffract the reference beam such that the angle between the first pulse front and second pulse front is reduced and/or minimized.

ix. A microscope as defined in clause vii or viii wherein said diffractive structure is operable such that an optical path length difference to source between the object radiation and the reference radiation is maintained smaller than a coherence length of the illumination radiation over the whole field of view at the detector plane.

x. A microscope as defined in any of clauses vii to ix, wherein the reference branch further comprises one or more beam steering elements operable to steer the reference radiation in combination with said diffractive structure such that high order spatial spectra are separate from a base spatial spectrum in a Fourier space representation of the holographic image for each relevant illumination condition.

xi. A microscope as defined in clause x, wherein said one or more beam steering elements is operable to steer the reference radiation in combination with said diffractive structure such that in said Fourier space representation:

the reference radiation is at least three times further from a pupil center than a de-magnified numerical aperture of the detection arrangement; and at least one beam of the reference radiation is shifted at least partly in a direction orthogonal to a pitch direction of the structure, such that the high order spatial spectra are off-axis with respect to said pitch direction.

xii. A method for determining a characteristic of interest of a structure on a substrate comprising:

providing illumination radiation to illuminate said structure;

capturing object radiation resulting from diffraction of the illumination radiation by said structure;

providing reference radiation for interfering with the object beam to obtain a holographic image; and varying a characteristic of the reference radiation so as to reduce and/or minimize spatial variation in a contrast metric of the holographic image within a field of view at a detector plane.

xiii. A dark field digital holographic microscope configured to perform the method of clauses xii.

xiv. A metrology apparatus for determining a characteristic of interest of a structure on a substrate comprising a dark field digital holographic microscope as defined in any of clauses i to xi, or clause xiii.

xv. An inspection apparatus for inspecting a structure on a substrate comprising a dark field digital holographic microscope as defined in any of clauses i to xi, or clause xiii.

Although specific reference may be made in this text to the use of lithographic apparatus in the manufacture of ICs, it should be understood that the lithographic apparatus described herein may have other applications. Possible other applications include the manufacture of integrated optical systems, guidance and detection patterns for magnetic domain memories, flat-panel displays, liquid-crystal displays (LCDs), thin-film magnetic heads, etc.

Although specific reference may be made in this text to embodiments of the invention in the context of a lithographic apparatus, embodiments of the invention may be used in other apparatus. Embodiments of the invention may form part of a mask inspection apparatus, a metrology apparatus, or any apparatus that measures or processes an object such as a wafer (or other substrate) or mask (or other patterning device). These apparatus may be generally referred to as lithographic tools. Such a lithographic tool may use vacuum conditions or ambient (non-vacuum) conditions.

Although specific reference may have been made above to the use of embodiments of the invention in the context of optical lithography, it will be appreciated that the invention, where the context allows, is not limited to optical lithography and may be used in other applications, for example imprint lithography.

While specific embodiments of the invention have been described above, it will be appreciated that the invention may be practiced otherwise than as described. The descriptions above are intended to be illustrative, not limiting. Thus it will be apparent to one skilled in the art that modifications may be made to the invention as described without departing from the scope of the claims set out below.

The invention claimed is:

1. A dark field digital holographic microscope configured to determine a characteristic of interest of a structure, the microscope comprising:
   an illumination branch configured to provide illumination radiation to illuminate the structure;
   a detection arrangement configured to capture object radiation resulting from diffraction of the illumination radiation by the structure;
   a reference branch configured to provide reference radiation for interfering with the object radiation to obtain an image of an interference pattern formed by the object radiation and reference radiation; and
   at least one reference branch optical element operable to modulate the reference radiation to impose a reference illumination profile which, when multiplied by a coherence contribution function of an intensity distribution of the interference pattern, results in an effective reference illumination profile with a substantially flat top.

2. The microscope as claimed in claim 1, wherein the contrast metric comprises a fringe contrast of interference fringes within the image.

3. The microscope as claimed in claim 1, wherein the reference illumination profile comprises a peak intensity at each of corresponding peripheral regions along one direction of a detector plane corresponding to a direction of spatial variation in a contrast metric of the image within a field of view of the microscope at the detector plane.

4. The microscope as claimed in claim 3, wherein the at least one reference branch optical element comprises a lens element having a high spherical aberration which causes central rays to focus before marginal rays so as to form the reference illumination profile.

5. The microscope as claimed in claim 1, wherein the reference radiation and illumination radiation have a bandwidth optimized to increase a width of the coherence contribution function.

6. The microscope as claimed in claim 1, wherein the illumination branch comprises an illumination branch optical element, wherein the illumination branch optical element and the at least one reference branch optical element are co-optimized for reducing spatial variation in a contrast metric of the image within a field of view of the microscope at a detector plane.

7. The microscope as claimed in claim 1, wherein the illumination branch optical element is operable to impose a substantially homogeneous illumination intensity or amplitude distribution on the illumination radiation.

8. The microscope as claimed in claim 1, wherein the at least one reference branch optical element comprises a diffractive structure operable to diffract the reference radiation to change the angle of its phase front so as to be more parallel to a phase front of the object radiation at the detector plane.

9. The microscope as claimed in claim 8, wherein the diffractive structure is operable to diffract the reference radiation such that an angle between a first phase front comprising the phase front of the object radiation and a second phase front comprising the phase front of the reference radiation at the detector plane is less than the central wavelength of the illumination and reference radiation squared divided by the product of the field of view and the bandwidth of the illumination and reference radiation.

10. The microscope as claimed in claim 9, wherein the diffractive structure is operable to diffract the reference radiation such that the angle between the first phase front and second phase front is reduced and/or minimized.

11. The microscope as claimed in claim 8, wherein the diffractive structure is operable to direct the reference radiation to the detector plane so as to interfere with the object radiation such that an optical path length difference to source between the object radiation and the reference radiation is maintained smaller than a coherence length of the illumination radiation over the whole field of view at the detector plane.

12. The microscope as claimed in claim 8, wherein the reference branch further comprises one or more beam steering elements operable to steer the reference radiation in combination with the diffractive structure such that high order spatial spectra are separate from a base spatial spectrum in a Fourier space representation of the image.

13. The microscope as claimed in claim 12, wherein the one or more beam steering elements is operable to steer the reference radiation in combination with the diffractive structure such that in a pupil plane of the detector plane:
   the reference radiation is at least three times further from a pupil center of the pupil plane than a de-magnified numerical aperture of the detection arrangement; and
   at least one beam of the reference radiation is shifted at least partly in a direction orthogonal to a pitch direction of the structure, such that the high order spatial spectra are off-axis with respect to the pitch direction.

14. A metrology apparatus for determining a characteristic of interest of a structure on a substrate, the metrology apparatus comprising the dark field digital holographic microscope as claimed in claim 1.

15. A method for determining a characteristic of interest of a structure on a substrate, the method comprising:
   providing illumination radiation to illuminate the structure;
   capturing object radiation resulting from diffraction of the illumination radiation by the structure;
   providing reference radiation for interfering with the object radiation to obtain an image of an interference pattern formed by the object radiation and reference radiation; and
   modulating the reference radiation to impose a reference illumination profile which, when multiplied by a coherence contribution function of an intensity distribution of the interference pattern, results in an effective reference illumination profile with a substantially flat top.

16. The method as claimed in claim 15, wherein the contrast metric comprises a fringe contrast of interference fringes within the image.

17. The method as claimed in claim 15, wherein the reference illumination profile comprises a peak intensity at each of corresponding peripheral regions along one direction of the detector plane corresponding to a direction of spatial variation in a contrast metric of the image within a field of view of the dark field digital holographic microscope at a detector plane.

18. The method as claimed in claim 15, wherein the reference radiation and illumination radiation have a bandwidth optimized to increase a width of the coherence contribution function.

19. The method as claimed in claim 15, wherein the illumination radiation and reference radiation are co-optimized for reducing spatial variation in a contrast metric of the image within a field of view of the microscope at a detector plane.

20. The method as claimed in claim 15, further comprising diffracting the reference radiation to change the angle of its phase front so as to be more parallel to a phase front of the object radiation at the detector plane.

\* \* \* \* \*